(12) United States Patent
Fang et al.

(10) Patent No.: US 9,931,573 B2
(45) Date of Patent: Apr. 3, 2018

(54) OPTIMAL PATROL STRATEGY FOR PROTECTING MOVING TARGETS WITH MULTIPLE MOBILE RESOURCES

(71) Applicant: UNIVERSITY OF SOUTHERN CALIFORNIA, Los Angeles, CA (US)

(72) Inventors: Fei Fang, Los Angeles, CA (US); Albert Jiang, Los Angeles, CA (US); Milind Tambe, Rancho Palos Verdes, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 277 days.

(21) Appl. No.: 14/176,953

(22) Filed: Feb. 10, 2014

(65) Prior Publication Data
US 2015/0273341 A1     Oct. 1, 2015

Related U.S. Application Data

(60) Provisional application No. 61/763,267, filed on Feb. 11, 2013.

(51) Int. Cl.
    *G06F 15/18*        (2006.01)
    *A63F 13/822*      (2014.01)
    (Continued)

(52) U.S. Cl.
    CPC .......... *A63F 13/822* (2014.09); *A63F 13/358* (2014.09); *A63F 13/40* (2014.09);
    (Continued)

(58) Field of Classification Search
    CPC ............. G01S 13/726; F41G 7/00; F41G 7/34
    (Continued)

(56) References Cited

U.S. PATENT DOCUMENTS 5,198,607 A * 3/1993 Livingston .......... F41H 13/0062
                                                        89/1.11
2004/0243378 A1* 12/2004 Schnatterly ............... G06F 8/20
                                                        703/22
(Continued)

OTHER PUBLICATIONS

Agmon, N., et al. 2008. Multi-robot perimeter patrol in adversarial settings. In IEEE International Conference on Robotics and Automation (ICRA), pp. 2339-2345.

(Continued)

*Primary Examiner* — David R Vincent
(74) *Attorney, Agent, or Firm* — Snell & Wilmer L.L.P.

(57) ABSTRACT

The following information may be read from a memory system: an identification of each of multiple moving targets that are each expected to move in accordance with a schedule of when and where the target will move; the schedule; an identification of each of multiple mobile defense resources that each have a maximum movement speed and a maximum protection radius; and the maximum movement speed and the maximum protection radius of each mobile defense resource. A computer system may determine where each mobile defense resource should be at each of a sequential set of different times so as to optimize the ability of the mobile defense resources to protect each of the mobile targets from a single attack by an attacker against one of the targets at an unknown time based on the information read from the memory system. The determining may take into consideration that the attacker may observe and analyze movements of the mobile defense resources prior to the attack in formulating the attack.

17 Claims, 6 Drawing Sheets

(51) Int. Cl.
- *A63F 13/67* (2014.01)
- *A63F 13/40* (2014.01)
- *G06F 3/0481* (2013.01)
- *A63F 13/358* (2014.01)
- *A63F 13/57* (2014.01)

(52) U.S. Cl.
CPC .............. *A63F 13/57* (2014.09); *A63F 13/67* (2014.09); *G06F 3/0481* (2013.01)

(58) Field of Classification Search
USPC ..................................................... 706/12, 45
See application file for complete search history.

(56) References Cited

U.S. PATENT DOCUMENTS

| | | | |
|---|---|---|---|
| 2008/0178819 A1 | 7/2008 | Sia et al. | |
| 2008/0263557 A1 | 10/2008 | Spata | |
| 2010/0015579 A1 | 1/2010 | Schlabach | |
| 2011/0043377 A1 | 2/2011 | McGrath et al. | |
| 2013/0027242 A1* | 1/2013 | Lee ......................... | G01S 7/292 342/156 |
| 2013/0192451 A1* | 8/2013 | Scott ....................... | F41G 3/147 89/41.05 |
| 2014/0274246 A1 | 9/2014 | Tsai et al. | |
| 2014/0279818 A1 | 9/2014 | Jiang et al. | |
| 2015/0143982 A1* | 5/2015 | Rovinsky ................ | F41H 11/02 89/1.11 |

OTHER PUBLICATIONS

Alpern, S. 1992. Infiltration Games on Arbitrary Graphs. Journal of Mathematical Analysis and Applications, 163:286-288.
An, B. et al. 2011. Refinement of strong Stackelberg equilibria in security games. In Proceedings of the Twenty-Fifth AAAI Conference on Artificial Intelligence (AAAI), pp. 587-593.
Basilico, N. et al. 2009. Leader-follower strategies for robotic patrolling in environments with arbitrary topologies. In Proceedings of the 8th International Conference on Autonomous Agents and Multiagent Systems (AAMAS), vol. 1, pp. 57-64.
Bosansky, B. et al. 2011. Computing time-dependent policies for patrolling games with mobile targets. In the 10th International Conference on Autonomous Agents and Multiagent Systems (AAMAS)—vol. 3, pp. 989-996.
Eppstein, D. et al. 2009. Studying Geographic Graph Properties of Road Networks Through an Algorithmic Lens. arXiv:0808.3694v2 [cs.CG] May 13, 2009.
Fudenberg, D. et al. 1991. Game Theory. MIT Press. Chapter 1: "Games in Strategic Form and Nash Equilibrium," pp. 3-44.
Gal, S. 1980. Search Games, Chapters 1-3, and 7 ("General Framework"; "Search for an Immobile Hider"; "Search for a Mobile Hider"; "Search on the Infinite Line"). Academic Press, New York, 1980, pp. 9-64, 137-160.
Haklay, M. et al. 2008. Openstreetmap:user-generated street maps. Pervasive Computing, IEEE, 7(4):pp. 12-18.
Halvorson, E. et al. 2009.Multi-step Multi-sensor Hider-Seeker Games. In IJCAI, pp. 159-166.
Jain, M. et al. 2011. A Double Oracle Algorithm for Zero-Sum Security Games on Graphs. Proc. of 10th Int. Conf. on Autonomous Agents and Multiagent Systems (AAMAS 2011), Turner, Yolum, Sonenberg and Stone (eds.), May 2-6, 2011, Taipei, Taiwan, pp. 327-334.
Jain, M. et al. 2012.The Deployment-to-Saturation Ratio in Security Games. In Proceedings of the Association for the Advancement of Artificial Intelligence (AAAI), Jul. 22-26, 2012, Toronto, Ontario, Canada, pp. 1362-1370.
Johnson, M.P. et al. 2012. Patrol strategies to maximize pristine forest area. In Proceedings of the Twenty-Sixth AAAI Conference on Artificial Intelligence, pp. 295-301.

Kiekintveld, C. et al. 2013. Security games with interval uncertainty. In Proceedings of the 2013 International Conference on Autonomous Agents and Multi-agent Systems, AAMAS '13, pp. 231-238.
Korzhyk, D. et al. 2010. Complexity of computing optimal Stackelberg strategies in security resource allocation games. In Proceedings of the 24th National Conference on Artificial Intelligence (AAAI), pp. 805-810.
Krause, A. et al. 2011. Randomized sensing in adversarial environments. In Proceedings of the 22nd International Joint Conference on Artificial Intelligence (IJCAI), pp. 2133-2139.
Letchford, J. et al. 2012. Computing optimal security strategies for interdependent assets. In the Conference on Uncertainty in Artificial Intelligence (UAI), pp. 459-468.
McMahan, H.B. et al. 2003. Planning in the Presence of Cost Functions Controlled by an Adversary. In ICML, pp. 536-543.
Miltersen, P. B. et al. 2007. Computing proper equilibria of zero-sum games. In Proceedings of the 5th International Conference on Computers and Games, CG'06, pp. 200-211.
Nemhauser, G.L. et al. 1978. An Analysis of Approximations for Maximizing Submodular Set Functions—I. Mathematical Programming, 14(1):265-294, Dec. 1978.
Okamoto, S. et al. 2012. Solving non-zero sum multiagent network flow security games with attack costs. In AAMAS, pp. 879-888.
Shieh, E. et al. 2012. Protect: A Deployed Game Theoretic System to Protect the Ports of the United States. In Proc. of 11th Int. Conf. on Autonomous Agents and Multiagent Systems (AAMAS 2012), Conitzer, Winikoff, Padgham and van der Hoek (eds.), Jun. 4-8, 2012, Valencia, Spain, pp. 13-20.
Sless, E. et al. 2014. Multi-Robot Adversarial Patrolling: Facing Coordinated Attacks. AAMAS, Proceedings of the 13th International Conference on Autonomous Agents and Multiagent Systems (AAMAS 2014), May 5-9, 2014, Paris France. 8 pages.
Tambe, M. 2011. Security and Game Theory: Algorithms, Deployed Systems, Lessons Learned, Cambridge University Press, Chapter 1, "Introduction," pp. 1-23; Chapter 4, "Deployed ARMOR Protection: The Application of a Game-Theoretic Model for Security at the Los Angeles International Airport," pp. 67-87; Chapter 8, "Computing Optimal Randomized Resource Allocations for Massive Security Games," pp. 156-176.
Tsai, J. et al. 2010. Urban Security: Game-Theoretic Resource Allocation in Networked Physical Domains. In AAAI, pp. 881-886.
Vanek, O. et al. 2011. Using multi-agent simulation to improve the security of maritime transit. In Proceedings of 12th International Workshop on Multi-Agent-Based Simulation (MABS), pp. 1-15.
Vanek, O. et al. 2012. Game-theoretic resource allocation for malicious packet detection in computer networks. In Proc. of 11th Int. Conf. on Autonomous Agents and Multiagent Systems (AAMAS), Conitzer, Winikoff, Padgham and van der Hoek (eds.), Jun. 4-8, 2012, Valencia, Spain, pp. 905-912.
Washburn, A. et al. 1995. Two-person Zero-sum Games for Network Interdiction. Operations Research, 43(2):243-251.
Yang, R. et al. 2012. Designing Better Strategies against Human Adversaries in Network Security Games (Extended Abstract). In Proceedings of the 11th International Conference on Autonomous Agents and Multiagent Systems—Innovative Applications Track (AAMAS 2012), Conitzer, Winikoff, Padgham, and van der Hoek, eds., Jun. 4-8, 2012, Valencia, Spain, pp. 1299-1300.
Yin, Z. et al. 2010. Stackelberg vs. Nash in Security Games: Interchangeability, Equivalence, and Uniqueness. In Proceedings of the 9th International Conference on Autonomous Agents and Multiagent Systems, pp. 1139-1146.
Yin, Z. et al. 2012. TRUSTS: Scheduling randomized patrols for fare inspection in transit systems. In Proceedings of the Twenty-Fourth Conference on Innovative Applications of Artificial Intelligence (IAAI), pp. 2348-2355.
U.S. Patent and Trademark Office. 2015. Non-final Office Action, dated Apr. 21, 2015, for U.S. Appl. No. 14/216,293, entitled "Security Scheduling for Real-World Networks," filed Mar. 17, 2014, Jain et al., inventors.
Basilico, N. et al. 2009. A Formal Framework for Mobile Robot Patrolling in Arbitrary Environments with Adversaries. Artificial Intelligence, Dec. 16, 2009, arXiv:0912.3275v1 [cs.GT], 68 pages.

(56) References Cited

OTHER PUBLICATIONS

Lau, H.C. et al. 2012. The Patrol Scheduling Problem. Practice and Theory of Automated Timetabling (PATAT 2012), Aug. 29-31, 2012, Son, Norway, pp. 175-192.

Pita, J. et al. 2008. Deployed Armor Protection: The Application of a Game Theoretic Model for Security at the Los Angeles International Airport. Proc of 7th Int. Conf. on Autonomous Agents and Multiagent Systems (AAMAS) 2008, Estoril, May 12-16, 2008, 8 pages.

U.S. Patent and Trademark Office. 2016. Non-final Office Action, dated Feb. 12, 2016, for U.S. Appl. No. 14/216,449, entitled "Game Theory Model for Patrolling an Area That Accounts for Dynamic Uncertainty," filed Mar. 17, 2014, Jiang et al., inventors.

Paruchuri, P. et al. 2008. Playing Games for Security: An Efficient Exact Algorithm for Solving Bayesian Stackelberg Games. Proceedings of 7th International Conference on Autonomous Agents and Multiagent Systems, 2008, Estoril, May 12-16, 2008, Portugal, pp. 895-902 (in Published Articles & Papers. Paper 45. http://research.create.usc.edu/published_papers/45).

UPSTO. 2016. Final Office Action, dated Oct. 7, 2016, for U.S. Appl. No. 14/216,449, "Game Theory Model for Patrolling an Area That Accounts for Dynamic Uncertainty," filed Mar. 17, 2014.

U.S. Office Action from U.S. Appl. No. 14/216,449, dated May 11, 2017.

\* cited by examiner

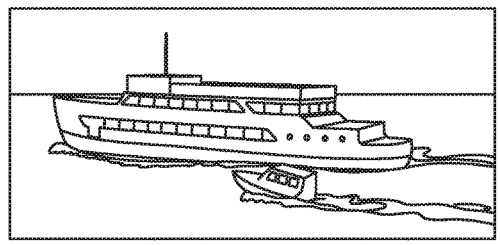 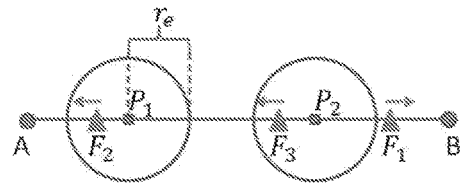
FIG. 1A       FIG. 1B
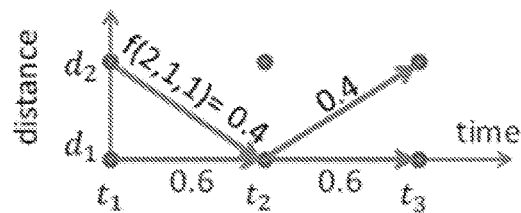
FIG. 2A
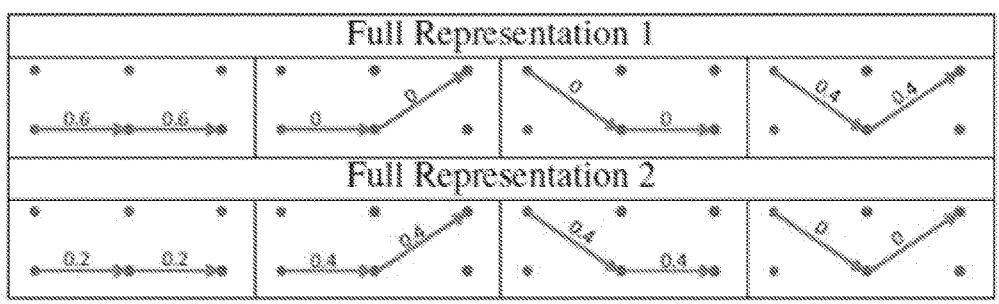
FIG. 2B

OPTIMAL PATROL STRATEGY FOR PROTECTING MOVING TARGETS WITH MULTIPLE MOBILE RESOURCES

CROSS-REFERENCE TO RELATED APPLICATION

This application is based upon and claims priority to U.S. provisional patent application 61/763,267, entitled "Optimal Patrol Strategy for Protecting Moving Targets with Multiple Mobile Resources," filed Feb. 11, 2013, attorney docket number 028080-0833.

The entire content of this application is incorporated herein by reference.

STATEMENT REGARDING FEDERALLY SPONSORED RESEARCH

This invention was made with government support under Grant No. PROTECT 53-4518-6920 and MURI grant W911NF-11-1-0332, awarded by the United States Coast Guard Research and Development Center. The government has certain rights in the invention.

BACKGROUND

Technical Field

This disclosure relates to techniques for determining where each of multiple mobile defense resources should be located to optimize the ability of the mobile defense resources to protect multiple mobile targets from an attack.

Description of Related Art

Stackelberg games have been widely applied to security domains, although most of this work has considered static targets, see Korzhyk, D., Conitzer, V., & Parr, R. (2010), "Complexity of computing optimal Stackelberg strategies in security resource allocation games," In Proceedings of the 24th National Conference on Artificial Intelligence (AAAI), pp. 805-810; Krause, A., Roper, A., & Golovin, D. (2011), "Randomized sensing in adversarial environments," In Proceedings of the 22nd International Joint Conference on Artificial Intelligence (IJCAI), pp. 2133-2139; Letchford, J., & Vorobeychik, Y. (2012), "Computing optimal security strategies for interdependent assets," In The Conference on Uncertainty in Artificial Intelligence (UAI), pp. 459-468; Kiekintveld, C., Islam, T., & Kreinovich, V. (2013), "Security games with interval uncertainty," In Proceedings of the 2013 International Conference on Autonomous Agents and Multi-agent Systems, AAMAS '13, pp. 231-238. Even when the players are mobile, e.g., in hider-seeker games, see Halvorson, E., Conitzer, V., & Parr, R. (2009), "Multi-step Multi-sensor Hider-Seeker Games," In IJCAI, infiltration games, see Alpern, S. (1992), "Infiltration Games on Arbitrary Graphs," Journal of Mathematical Analysis and Applications, 163, 286-288, or search games, see Gal, S. (1980), "Search Games," Academic Press, New York, the models have considered static targets if any. Additionally, even when the targets were mobile, e.g., trains, see Yin, Z., Jiang, A. X., Johnson, M. P., Kiekintveld, C., Leyton-Brown, K., Sandholm, T., Tambe, M., & Sullivan, J. P. (2012), "TRUSTS: Scheduling randomized patrols for fare inspection in transit systems," In Proceedings of the Twenty-Fourth Conference on Innovative Applications of Artificial Intelligence (IAN), pp. 2348-2355, the players were restricted to move along the targets to protect or attack them (the targets there are in essence stationary). Thus, these models may not be applicable to the problem with mobile resources and moving targets.

With respect to related work computing defender strategies for patrolling domains, see Agmon, N., Kraus, S., & Kaminka, G. A. (2008), "Multi-robot perimeter patrol in adversarial settings," In IEEE International Conference on Robotics and Automation (ICRA), pp. 2339-2345, compute strategies for setting up a perimeter patrol in adversarial settings with mobile patrollers. Similarly, Basilico, N., Gatti, N., & Amigoni, F. (2009), "Leader-follower strategies for robotic patrolling in environments with arbitrary topologies," In Proceedings of The 8th International Conference on Autonomous Agents and Multiagent Systems (AAMAS)—Volume 1, pp. 57-64, compute the leader-follower equilibrium for robotic patrolling in environments with arbitrary topologies. In the same way, M. P. Johnson, F. Fang, and M. Tambe, "Patrol strategies to maximize pristine forest area," In AAAI, 2012, propose a continuous game model for protecting forests from illegal logging. However, the targets are stationary in all this related work and may not fit the moving targets problem.

Bosansky, B., Lisy, V., Jakob, M., & Pechoucek, M. (2011), "Computing time-dependent policies for patrolling games with mobile targets," In The 10th International Conference on Autonomous Agents and Multiagent Systems (AAMAS)—Volume 3, pp. 989-996 and Vanek, O., Jakob, M., Hrstka, O., & Pechoucek, M. (2011), "Using multi-agent simulation to improve the security of maritime transit," In Proceedings of 12th International Workshop on Multi-Agent-Based Simulation (MABS), pp. 1-16, studied the problem of protecting moving targets. However, they both considered a model in which the defender, the attacker and targets have discretized movements on a directed graph. Such discretization of attacker strategy spaces may introduce sub-optimality in the solutions when attacker is allowed to choose strategy from a continuous strategy space. Furthermore, Bosansky et al. (see, Bosansky, B., Lisy, V., Jakob, M., & Pechoucek, M. (2011), "Computing time-dependent policies for patrolling games with mobile targets," In The 10th International Conference on Autonomous Agents and Multiagent Systems (AAMAS)—Volume 3, pp. 989-996) presented a formulation with non-linear constraints, which may face scaling problems even with a single defender resource.

SUMMARY

The following information may be read from a memory system: an identification of each of multiple moving targets that are each expected to move in accordance with a schedule of when and where the target will move; the schedule; an identification of each of multiple mobile defense resources that each have a maximum movement speed and a maximum protection radius; and the maximum movement speed and the maximum protection radius of each mobile defense resource. A computer system may determine where each mobile defense resource should be at each of a sequential set of different times so as to optimize the ability of the mobile defense resources to protect each of the mobile targets from a single attack by an attacker against one of the targets at an unknown time based on the information read from the memory system. The determining may take into consideration that the attacker may observe and analyze movements of the mobile defense resources prior to the attack in formulating the attack.

The determining where each mobile defense resource should be at each of a sequential set of different times so as to optimize the ability of the mobile defense resources to protect each of the mobile targets from the attack may take into consideration that the attacker may formulate an optimum attack in view of the attacker's observation and analysis of the movements of the mobile defense resources prior to the attack.

The determining where each mobile defense resource should be at each of the sequential set of different times so as to optimize the ability of the mobile defense resources to protect each of the mobile targets from the attack may include: selecting a finite set of locations at which each mobile defense resource may be; and limiting the locations at which each mobile defense resource should be to the finite set of locations.

The schedule may specify that the targets will move to locations that are not all co-linear.

Each target may have an importance value which changes as a function time. The importance value of each target may be stored in the memory system. The importance values may be considered when determining where each mobile defense resource should be at each of the sequential set of different times so as to optimize the ability of the mobile defense resources to protect each of the mobile targets from the attack.

The schedule may specify that the targets will move to locations that are not all co-linear.

The determining of where each mobile defense resource should be at each of the sequential set of different times so as to optimize the ability of the mobile defense resources to protect each of the mobile targets from the attack based on the information in the memory system may include selecting a finite set of locations at which each mobile defense resource may be. The locations determined for each of the mobile defense resources may be limited to the finite set of locations.

The attack may occur at one of a sequential set of times. The sequential set of times may be stored in the memory system. The determining where each mobile defense resource should be at each of a sequential set of different times so as to optimize the ability of the mobile defense resources to protect each of the mobile targets from the attack may represent a joint probability of each mobile defense resource moving from one location to another between two consecutive times of the sequential set of different times specified in the memory system as a variable in a linear program.

The schedule may specify that the targets will move to locations that are not all co-linear. Each target may have an importance value that changes as a function time. The importance values of each target are stored in the memory system, and the determining where each mobile defense resource should be at each of a sequential set of different times so as to optimize the ability of the mobile defense resources to protect each of the mobile targets from the attack may take into consideration the importance values as a function of time.

The determining of where each mobile defense resource should be at each of the sequential set of different times so as to optimize the ability of the mobile defense resources to protect each of the mobile targets from the attack based on the information in the memory system may include selecting a finite set of locations at which each mobile defense resource may be. The locations that are determined for each of the mobile defense resources may be limited to the finite set of locations.

The following information may be read from a memory system: an identification of each of multiple moving targets that are each expected to move in accordance with a schedule of when and where the target will move; the schedule; an identification of each of multiple mobile defense resources that each have a maximum movement speed and a maximum protection radius; the maximum movement speed and the maximum protection radius of each mobile defense resource; a sequential set of different times; a finite set of locations at which each mobile defense resource may be at each of the sequential set of different times; and a set of probabilities indicating the joint probability that each mobile defense resource moves from a location to another between two consecutive time points. A computer system may determine where each mobile defense resource should be at each of a sequential set of different times so as to optimize the ability of the mobile defense resources to protect each of the mobile targets from the attack based on the information in the memory system. The determining may take into consideration that the attacker may observe and analyze movements of the mobile defense resources prior to formulating the attack and may deviate from an optimum attack based on the observation and analysis in formulating the attack.

The determining of where each mobile defense resource should be at each of a sequential set of different times so as to enhance the ability of the mobile defense resources to protect each of the mobile targets from the attack may include: decomposing the stored set of probabilities into multiple groups of routes for the multiple defense resources; for each group of routes, determining a new group of routes that provides better protection to targets than the group of routes; and combining the new groups of routes into a new set of probabilities indicating the joint probability that each mobile defense resource moves from a location to another between two consecutive time points.

The determining of where each mobile defense resource should be at each of the sequential set of different times so as to enhance the ability of the mobile defense resources to protect each of the mobile targets from the attack may include setting up a set of linear programs for multiple pairs of two consecutive times in the sequential set of different times so as to optimize the ability of the mobile defense resources to protect each of the mobile targets from potential attack between each of the two consecutive times.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1A illustrates protecting ferries with patrol boats.

FIG. 1B illustrates an example of three targets (triangles) being protected by two patrollers (squares).

FIG. 2A illustrates a compact representation of a mixed defender strategy. The x-axis shows time intervals and the y-axis shows discretized distance-points in one-dimensional movement space.

FIG. 2B illustrates two mixed defender strategies in a full representation that can be mapped into the same compact representation shown in FIG. 2A.

DETAILED DESCRIPTION OF ILLUSTRATIVE EMBODIMENTS

Figure 3:
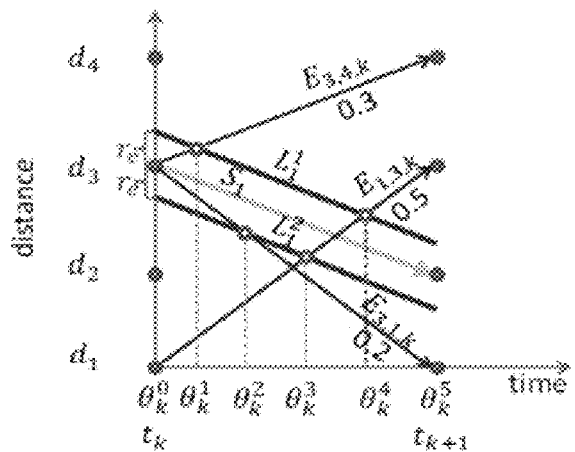
FIG. 3 illustrates changes of AttEU in $(t_k, t_{k+1})$.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

A novel game model called $MRMT_{sg}$ addresses the problem of multiple mobile resources protecting moving targets. $MRMT_{sg}$ may be an attacker-defender Stackelberg game model with a continuous set of strategies for the attacker. In contrast, while the defender's strategy space may also be continuous, it may be discretized in $MRMT_{sg}$ for various reasons. Firstly, if the defender's strategy space is allowed to be continuous, the space of mixed strategies for the defender would then have infinite dimensions, which makes exact computation infeasible. Secondly, in practice, the patrollers are not able to have such fine-grained control over their vehicles, which makes the actual defender's strategy space effectively a discrete one. Finally, the discretized defender strategy space is a subset of the original continuous defender strategy space, so the optimal solution calculated under this formulation is a feasible solution in the original game and gives a lower-bound guarantee for the defender in terms of expected utility for the original continuous game. On the other hand, discretizing the attacker's strategy space can be highly problematic. In particular, if a randomized schedule is deployed for the defender under the assumption that the attacker could only attack at certain discretized time points, the actual attacker could attack at some other time point, leading to a possibly worse outcome for the defender.

A second feature that may be included is CASS (Solver for Continuous Attacker Strategies). This is an efficient linear program that may exactly solve $MRMT_{sg}$. Despite discretization, the defender strategy space still has an exponential number of pure strategies. CASS overcomes the shortcoming by compactly representing the defender's mixed strategies as marginal probability variables. On the attacker side, CASS exactly and efficiently models the attacker's continuous strategy space using sub-interval analysis, which is based on the observation that given the defender's mixed strategy, the attacker's expected utility is a piecewise-linear function. Along the way to presenting CASS, DASS (Solver for Discretized Attacker Strategies) is presented, which finds minimax solutions for $MRMT_{sg}$ games while constraining the attacker to attack at discretized time points.

A third feature that may be included is equilibrium refinement for $MRMT_{sg}$. This game has multiple equilibria, and the defender strategy found by CASS can be suboptimal with respect to uncertainties in the attacker's model, e.g., if the attacker can only attack during certain time intervals. This approach provides two heuristic equilibrium refinement approaches for the game. The first, route-adjust, iteratively computes a defender strategy that dominates earlier strategies. The second, flow-adjust, is a linear-programming-based approach. Experiments show that flow-adjust is computationally faster than route-adjust but route-adjust is more effective in selecting robust equilibrium strategies.

An optional additional feature may be several sampling methods for generating practical patrol routes given the defender strategy in compact representation.

A detailed experimental analyses of algorithms in the ferry protection domain is also presented.

Problem Statement

One major example of practical domains motivating this work is the problem of protecting ferries that carry passengers in many waterside cities. Packed with hundreds of passengers, these may present attractive targets to attack (e.g., with a small boat packed with explosives that may be only detected once it gets close to the ferry). Small, fast patrol boats can provide protection to such ferries, but there are often limited numbers of patrol boats, i.e., they cannot protect the ferries at all times at all locations. FIG. 1A shows a patrol boat protecting a moving ferry. Other examples include protecting refugee aid convoys with overhead UAVs and protecting vessels from pirate activity.

Domain description. In this problem, there are L moving targets $F_1, F_2, \ldots, F_L$. It is assumed that these targets move along a one-dimensional domain, specifically a straight line segment linking two terminal points, named A and B. FIG. 1B shows an illustrative instance of three targets (triangles) and two patrollers (squares). In this instance, patroller $P_1$ is protecting $F_2$ and $P_2$ is protecting $F_3$. This model is sufficient to capture real-world domains such as ferries moving back-and-forth in a straight line between two terminals as they do in many ports around the world. The targets have fixed daily schedules. The schedule of each target can be described as a continuous function $S_q : T \to D$ where $q=1, \ldots, L$ is the index of the target, $T=[0,1]$ represents the continuous time interval of a typical day (normalized) and $D=[0,1]$ is the continuous space of possible locations (normalized) with 0 corresponding to terminal A and 1 terminal B. So $S_q(t)$ denotes the position of the target $F_q$ at a specified time t. $S_q$ is assumed to be piecewise linear.

The defender has W mobile patrollers that can move along D to protect the targets, denoted as $P_1, P_2, \ldots, P_W$. Although faster than the targets, they have a maximum speed $v_m$ (range of velocity is $[-v_m, v_m]$). The attacker will choose a certain time and a certain target to attack. The probability of attack success depends on the positions of the patrollers at that time. Specifically, each patroller can detect and try to intercept anything within the protection radius $r_e$ but cannot detect the attacker prior to that radius. Thus, a patroller protects all targets within her protective circle of radius $r_e$ (centered at her current position), as in FIG. 1B). Symmetrically, a target is protected by all patrollers whose protective circles can cover it. If the attacker attacks a protected target, then the probability of successful attack is a decreasing function of the number of patrollers that are protecting the target. Formally, a set of coefficients $\{C_G\}$ is used to describe the strength of the protection.

Definition 1. Let $G \in \{1, \ldots, W\}$ be the total number of patrollers protecting a target $F_q$, i.e., there are G patrollers such that $F_q$ is within radius $r_e$ of each of the G patrollers. Then $C_G \in [0,1]$ specifies the probability that the patrollers can successfully stop the attacker. $C_{G_1} \leq C_{G_2}$ if $G_1 \leq G_2$, i.e., more patrollers offer stronger protection.

As with previous work in security games (see M. Tambe, "*Security and Game Theory: Algorithms, Deployed Systems, Lessons Learned,*" Cambridge University Press, 2011; Yin, Z., Jiang, A. X., Johnson, M. P., Kiekintveld, C., Leyton-Brown, K., Sandholm, T., Tambe, M., & Sullivan, J. P. (2012), "*TRUSTS: Scheduling randomized patrols for fare inspection in transit systems,*" In Proceedings of the Twenty-Fourth Conference on Innovative Applications of Artificial Intelligence (IAAI), pp. 2348-2355), this game can be modeled as a Stackelberg game, where the defender commits to a randomized strategy first, and then the attacker can respond to such a strategy. By convention, the defender is denoted as "she" and the attacker is denoted as "he."

Defender strategy. A pure strategy of defender is to designate a moving schedule for each patroller. Analogous to the target's schedule, a patroller's schedule can be written as a continuous function $R_u: T \to D$ where $u=1, \ldots, W$ is the index the patroller. $R_u$ must be compatible with the patroller's velocity range.

Attacker strategy. The attacker conducts surveillance of the defender's mixed strategy and the targets' schedules; he may then execute a pure strategy response to attack a certain target at a certain time. The attacker's pure strategy can be denoted as $(F_q, t)$ where $F_q$ is the target to attack and t is the time to attack.

Utilities. A zero-sum game is considered. If the attacker performed a successful attack on target $F_q$ at location x at time t, he gets a positive reward $U_q(x,t)$ and the defender gets $-U_q(x,t)$, otherwise both players get utility zero. The positive reward $U_q(x, t)$ is a known function which accounts for many factors in practice. For example, an attacker may be more effective in his attack when the target is stationary (such as at a terminal point) than when the target is in motion. As the target's position is decided by the schedule, the utility function can be written as $U_q(t) \equiv U_q(S_q(t), t)$. It is assumed that $U_q(t)$ can be represented as a piecewise linear function of t for each target $F_q$.

Models $MRMT_{sg}$ model may use a discretized strategy space for the defender and a continuous strategy space for the attacker. For clarity of exposition, DASS approach to compute a minimax solution for discretized attacker strategy space is introduced first, followed by CASS for the attacker's continuous strategy space. A single patroller at first and the generalize to multiple patroller is shown later. Since the game is zero-sum, minimax (minimizing the maximum attacker utility) is used as it returns the same solution as Strong Stackelberg Equilibrium (see Fudenberg, D., & Tirole, J. (1991), "*Game Theory,*" MIT Press. Korzhyk, D., Conitzer, V., & Parr, R. (2010), "*Complexity of computing optimal Stackelberg strategies in security resource allocation games,*" In Proceedings of the 24th National Conference on Artificial Intelligence (AAAI), pp. 805-810) for $MRMT_{sg}$.

Representing Defender's Strategies

Since the defender's strategy space is discretized, each patroller is assumed to makes changes only at a finite set of time points=$\{t_1, t_2, \ldots, t_M\}$, evenly spaced across the original continuous time interval. $t_1=0$ is the starting time and $t_M=1$ is the normalized ending time. Denote by $\delta t$ the distance between two adjacent time points:

$$t = t_{k+1} - t_k = \frac{1}{M-1}.$$

$\delta t$ is chosen to be small enough such that for each target $F_q$, the utility function $U_q(t)$ and the moving schedule $S_q(t)$ are linear within each interval $[t_k, t_{k+1}]$ for $k=1, \ldots, M-1$, i.e., the target is moving with uniform speed and linearly changing utility during each of these intervals.

In addition to discretization in time, the line segment AB that the targets move along is also discretized into a set of points $D=\{d_1, d_2, \ldots, d_N\}$ and each patroller is restricted to be located at one of the discretized points $d_i$ at any discretized time point $t_k$. During each time interval $[t_k, t_{k+1}]$, each patroller moves with constant speed from her location $d_i$ at time $t_k$ to her location $d_j$ at time $t_{k+1}$. The points $d_1, d_2, \ldots, d_N$ are ordered by their distance to terminal A, and $d_1$ refers to A and $d_N$ refers to B. Since the time interval is discretized into M points, a patroller's route $R_u$ ($R_u$ is, in essence, a mapping of $T \to D$) can be represented as a vector $R_u=(d_{R_u(1)}, d_{R_u(2)}, \ldots, d_{R_u(M)})$. $R_u(k)$ is the index of the discretized distance point where the patroller is located at time $t_k$.

For a single defender resource in the full representation, the defender's mixed strategy assigns a probability to each of the patrol routes that can be executed. If $v_m$ is large enough, there are in total $N^M$ patrol routes, which makes the full representation intractable. Therefore, a compact representation of the defender's mixed strategy is used and the defender's strategy is represented with flow distribution variables $\{f(i,j,k)\}$. $f(i,j,k)$ is the probability of the patroller moving from $d_i$ at time $t_k$ to $d_j$ at time $t_{k+1}$. The complexity of the compact representation is $O(MN^2)$, much more efficient compared to the full representation. FIG. 2A shows a simple example illustrating the compact representation. In FIG. 2A, the x-axis shows time intervals and the y-axis shows the discretized distance points in the one-dimensional movement space. Numbers on the edges indicate the value of $f(i,j,k)$. Denote by $E_{i,j,k}$ the directed edge linking nodes ($t_k$, $d_i$) and ($t_{k+1}$, $d_j$). For example, $f(2,1,1)$, the probability of the patroller moving from $d_2$ to $d_1$ during time $t_1$ to $t_2$, is shown on the edge $E_{2,1,1}$ from node ($t_1$, $d_2$) to node ($t_2$, $d_1$). While a similar compact representation was used earlier in Yin (see Yin, Z., Jiang, A. X., Johnson, M. P., Kiekintveld, C., Leyton-Brown, K., Sandholm, T., Tambe, M., & Sullivan, J. P. (2012), "*TRUSTS: Scheduling randomized patrols for fare inspection in transit systems,*" In Proceedings of the Twenty-Fourth Conference on Innovative Applications of Artificial Intelligence (IAAI), pp. 2348-2355), here it is used in a continuous setting.

Any strategy in full representation can be mapped into a compact representation. If there are H possible patrol routes $R_1, R_2, \ldots, R_H$, a strategy in full representation can be denoted as a probability vector $(p(R_1), \ldots, p(R_H))$ where $p(R_u)$ is the probability of taking route $R_u$. Taking route $R_u$ means the patroller moves from $d_{R_u(k)}$ to $d_{R_u(k+1)}$ during time $[t_k, t_{k+1}]$, so the edge $E_{R_u(k), R_u(k+1), k}$ is taken when route $R_u$ is chosen. Then the total probability of taking edge $E_{i,j,k}$ is the sum of probabilities of all the routes $R_u$ where $R_u(k)=i$ and $R_u(k+1)=j$. Formally, $$f(i, j, k) = \sum_{R_u: R_u(k)=i \text{ and } R_u(k+1)=j} p(R_u) \quad (1)$$

Different mixed strategies in full representation can be mapped to the same compact representation. FIG. 2B shows a table of two full representations for two mixed strategies. The probability of a route is labeled on all edges in the route in full representation. $f(i,j,k)$ can be calculated by adding up the numbers of a particular edge $E_{i,j,k}$ in all routes of a full representation together (shown in FIG. 2A).

This compact representation does not lead to any loss in solution quality. Recall the goal is to find an optimal defender strategy that minimizes maximum attacker utility. The attacker expected utility of attacking target $F_q$ at time t given defender strategy f can be expressed as $$AttEU_f(F_q,t)=(1-C_1\omega(F_q,t))U_q(t) \quad (2)$$

where $U_q(t)$ is the reward for a successful attack, $\omega(F_q,t)$ is the probability that the patroller is protecting target $F_q$ at time t and $C_1$ is the protection coefficient of single patroller. The subscript is dropped if f is obvious from the context. As $C_1$ and $U_q(t)$ are constants for a given attacker's pure strategy $(F_q,t)$, $AttEU(F_q,t)$ is purely decided by $\omega(F_q,t)$. As shown later in this document, $\omega(F_q,t)$ can be calculated from the compact representation $\{f(i,j,k)\}$. If two defender strategies under the full representation are mapped to the same compact representation $\{f(i,j,k)\}$, they will have the same $\omega$ function and AttEU for any attacker's pure strategy $(F_q,t)$. Compact representation has the following properties.

Property 1. For any time interval $[t_k,t_{k+1}]$, the sum of all flow distribution variables equals to 1: $\Sigma_{i=1}^N \Sigma_{j=1}^N f(i,j,k)=1$.

Property 2. The sum of flows that go into a particular node equals the sum of flows that go out of the node. Denote the sum as $p(i,k)$, then $p(i,k)=\Sigma_{j=1}^N f(j,i,k-1)=\Sigma_{j=1}^N f(i,j,k)$.

Property 3. Combining Property 1 and 2, $\Sigma_{i=1}^N p(i,k)=1$.

DASS: Discretized Attacker Strategies

DASS (Solver for Discretized Attacker Strategies) efficiently finds minimax solutions for MRMT-based games while constraining the attacker to attack at discretized time points $t_k$. That is, v need to be minimized where v is the maximum of attacker's expected utility. Here, v is the maximum of $AttEU(F_q,t)$ for any target $F_q$ at any discretized time point $t_k$.

It is known from Equation (2) that $AttEU(F_q,t)$ is decided by $\omega(F_q,t)$, the probability that the patroller is protecting target $F_q$ at time t. Given the position of the target $S_q(t)$, the protection range can be defined as $\beta(F_q,t)=[\max\{S_q(t)-r_e, d_1\}, \min\{S_q(t)+r_e, d_N\}]$. If the patroller is located within the range $\beta(F_q,t)$, the distance between the target and the patroller is no more than $r_e$ and thus the patroller is protecting $F_q$ at time t. So $\omega(F_q,t)$ is the probability that the patroller is located within range $\beta(F_q,t)$ at time t.

Definition 2. $I(i,q,k)$ is a function of two values. $I(i,q,k)=1$ if $d_i \in \beta(F_q,t_k)$, and otherwise $I(i,q,k)=0$.

In other words, $I(i,q,k)=1$ means that a patroller located at $d_i$ at time $t_k$ is protecting target $F_q$. The probability that the patroller is at $d_i$ at time $t_k$ is $p(i,k)$. So the probability that a target is protected at time $t_k$ can be calculated as follows.

$$\omega(F_q, t_k) = \sum_{i:I(i,q,k)=1} p(i,k) \quad (3)$$

$$AttEU(F_q, t_k) = \left(1 - C_1 \sum_{i:I(i,q,k)=1} p(i,k)\right) U_q(t) \quad (4)$$

Equation (4) follows from Equations (2) and (3). Finally, the speed restrictions on the patroller must be addressed. DASS set all flows that are not achievable to zero, that is $f(i,j,k)=0$ if $|d_i-d_j|>v_m\delta t$. Thus, DASS can be formulated as the following linear program:

$$\min_{f(i,j,k),p(i,k)} v \quad (5)$$

$$f(i,j,k) \in [0,1], \forall i,j,k \quad (6)$$

$$f(i,j,k) = 0, \forall i,j,k \text{ such that } |d_j - d_i| > v_m \delta t \quad (7)$$

$$p(i,k) = \sum_{j=1}^N f(j,i,k-1), \forall i, \forall k>1 \quad (8)$$

$$p(i,k) = \sum_{j=1}^N f(i,j,k), \forall i, \forall k<M \quad (9)$$

$$\sum_{i=1}^N p(i,k) = 1, \forall k \quad (10)$$

$$v \geq AttEU(F_q, t_k), \forall q, k \quad (11)$$

Constraint 7 describes the speed limit. Constraint 6 describes the probability range. Constraints 8-9 describes Property 2. Constraint 10 is exactly Property 3. Property 1 can be derived from property 2 and 3, so it is not listed as a constraint. Constraint 11 shows the attacker chooses the strategy that gives him the maximal expected utility among all possible attacks at discretized time points; where AttEU (•) is described by Equation 4.

CASS: Continuous Attacker Strategies

Figure 4A:
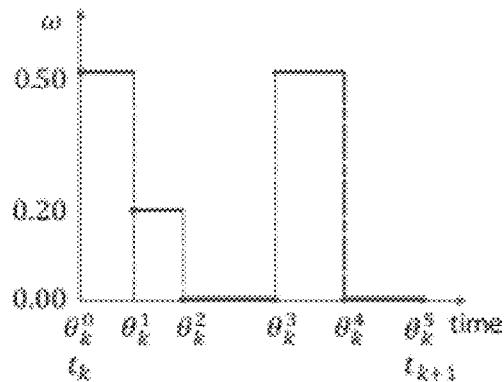
FIGS. 4A-4B illustrate a sub-interval analysis.

Unfortunately, DASS's solution quality guarantee may fail: if the attacker chooses to attack between $t_k$ and $t_{k+1}$, he may get a higher expected reward than attacking at $t_k$ or $t_{k+1}$. Consider the following example: FIG. 3 shows the defender's compact strategy between $t_k$ and $t_{k+1}$. Here the defender's marginal strategy has only three non-zero variables $f(3,4,k)=0.3$, $f(3,1,k)=0.2$, and $f(1,3,k)=0.5$, indicated by the set of three edges $E^+=\{E_{3,4,k}, E_{3,1,k}, E_{1,3,k}\}$. There is only one target, which moves from $d_3$ to $d_2$ at constant speed during $[t_k, t_{k+1}]$. Its schedule is depicted by the straight line segment $S_1$. The dark lines $L_1^1$ and $L_1^2$ are parallel to $S_1$ with distance $r_e$. The area between them indicates the protection range $\beta(F_q,t)$ for any time $t \in (t_k, t_{k+1})$. Consider the time points at which an edge from $E^+$ intersects one of $L_1^1, L_1^2$ (labeled as $\theta_k^r$, $r=1 \ldots 4$ in FIG. 3). Intuitively, these are all the time points at which a defender patrol could potentially enter or leave the protection range of the target. To simplify the notation, $t_k$ is denoted as $\theta_k^0$ and $t_{k+1}$ is denoted as $\theta_k^5$. For example, a patroller moving from $d_3$ to $d_4$ (or equivalently, taking the edge $E_{3,4,k}$) protects the target from $\theta_k^0$ to $\theta_k^1$ because $E_{3,4,k}$ is between $L_1^1$ and $L_1^1$ in $[\theta_k^0, \theta_k^1]$, during which the distance to the target is less or equal than protection radius $r_e$. Consider the sub-intervals between each $\theta_k^j$ and $\theta_k^{j+1}$, for $j=0 \ldots 4$. FIG. 4A shows the probability that the target is protected in each sub-interval. Since within each of these five sub-intervals, no patroller enters or leaves the protection range, the probability that the target is being protected is a constant in each sub-interval, as shown in FIG. 4A.

Figure 4B:
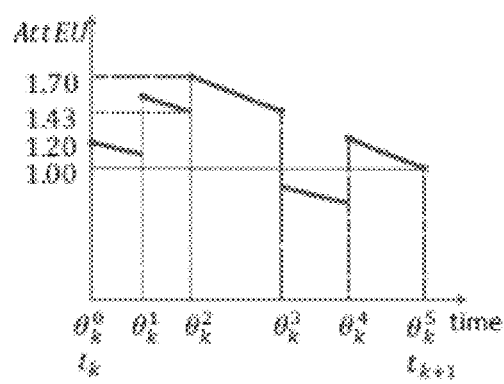

Suppose $U(F_q,t)$ decreases linearly from 2 to 1 during $[t_k, t_{k+1}]$ and $C_1=0.8$. FIG. 4b shows the attacker's expected utility in $[t_k, t_{k+1}]$. As $\omega(F_q,t)$ is constant in each sub-interval, $AttEU(F_q,t)$ is linear in $[\theta_k^r, \theta_k^{r+1}]$ but the function is discontinuous at the intersection points $\theta_k^1, \ldots \theta_k^4$, because of the discontinuity of $\omega(F_q,t)$. Introduce the following notations:

$$\lim_{t \to \theta_k^{r-}} AttEU(F_q, t) = AttEU(F_q, \theta_k^{r-})$$

$$\lim_{t \to \theta_k^{r+}} AttEU(F_q, t) = AttEU(F_q, \theta_k^{r+})$$

An attacker can choose to attack at a time immediately after $\theta_k^2$, getting an expected utility that is arbitrarily close to 1.70. According to Equation (4), $AttEU(F_q, t_k) = 1.2$ and $AttEU(F_q, t_{k+1}) = 1.00$, both lower than $AttEU(F_q, \theta_k^{2+})$.

Thus, the attacker can get a higher expected reward by attacking between $t_k$ and $t_{k+1}$. However, because of discontinuities in the attacker's expected utility function, a maximum might not exist. This implies that the minimax solution concept might not be well-defined for this game. Thus the solution concept can be defined to be minimizing the supremum of $AttEU(F_q, t)$. Supremum is defined to be the smallest real number that is greater than or equal to any $AttEU(F_q, t)$, i.e., it is the least upper bound. In the above example, the supremum of attacker's expected utility in $(t_k, t_{k+1})$ is $AttEU(F_q, \theta_k^{1+}) = 1.70$. Formally, a defender strategy f is minimax if $f \in \operatorname{argmin}_f \sup AttEU_f(F_q, t)$.

The above process (called sub-interval analysis) can be generalized to all possible edges $E_{i,j,k}$ to deal with the possible attacks between the discretized points and find an optimal defender strategy. Making use of the piecewise linearity of $AttEU(F_q, t)$ and the fact that the potential discontinuity points are fixed, a linear program can be constructed to solve the problem to optimality. This approach is named as CASS (Solver for Continuous Attacker Strategies).

The general sub-interval analysis is described as follows. For any target $F_q$ and any time interval $(t_k, t_{k+1})$, calculate the intersection points of edges $E_{i,j,k}$ and $L_q^1$, $L_q^2$. Sort the intersection points in increasing order, denoted as $\theta_k^r$, $r = 1 \ldots M_{qk}$, where $M_{qk}$ is the total number of intersection points. Set $\theta_k^0 = t_k$ and $\theta_k^{M_{qk}+1} = t_{k+1}$. Thus $(t_k, t_{k+1})$ is divided into sub-intervals $(\theta_k^r, \theta_k^{r+1})$, $r = 0, \ldots, M_{qk}$.

Lemma 1. $AttEU(F_q, t)$ is piecewise linear in t with the same set of potential discontinuous points independent of the defender strategy.

Proof: In each sub-interval, an edge $E_{i,j,k}$ is either totally between lines $L_q^1$ and $L_q^2$ or totally above/below the two lines. Otherwise there will be a new intersection point which contradicts the procedure. If edge $E_{i,j,k}$ is between $L_q^1$ and $L_q^2$, the distance between a patroller taking the edge and target $F_q$ is less than $r_e$, meaning the target is protected by the patroller. As edge $E_{i,j,k}$ is taken with probability $f(i,j,k)$, the total probability that the target is protected ($\omega(F_q, t)$) is the sum of $f(i,j,k)$ whose corresponding edge $E_{i,j,k}$ is between the two lines in a sub-interval. So $\omega(F_q, t)$ is constant and thus the attacker's expected utility $AttEU(F_q, t)$ is linear in each sub-interval according to Equation 2 as $U(F_q, t)$ is linear in $[t_k, t_{k+1}]$. Discontinuity can only exist at these intersection points and upper bound on the number of these points is $MN^2$.

Define coefficient $A_{qk}^r(i,j)$ to be $C_1$ if edge $E_{i,j,k}$ is between $L_q^1$ and $L_q^2$ in $(\theta_k^r, \theta_k^{r+1})$ and 0 otherwise. Equation (2) and the fact that $\omega(F_q, t)$ is the sum of $f(i,j,k)$ whose corresponding coefficient $A_{qk}^r(i,j) = C_1$ yields the following equation for $t \in (\theta_k^r, \theta_k^{r+1})$.

$$AttEU(F_q, t) = \left(1 - \sum_{i=1}^{N} \sum_{j=1}^{N} A_{qk}^r(i,j) f(i,j,k)\right) \cdot U_q(t) \quad (12)$$

Piecewise linearity of $AttEU(F_q, t)$ means the function is mono-tonous in each sub-interval and the supremum can be found at the intersection points. Because of linearity, the supremum of AttEU in $(\theta_k^r, \theta_k^{r+1})$ can only be chosen from the one-sided limits of the endpoints, $AttEU(F_q, \theta_k^{r+})$ and $AttEU(F_q, \theta_k^{(r+1)-})$. Furthermore, if $U(F_q, t)$ is decreasing in $[t_k, t_{k+1}]$, the supremum is $AttEU(F_q, \theta_k^{r+})$ and otherwise it is $AttEU(F_q, \theta_k^{(r+1)-})$. In other words, all other attacker's strategies in $(\theta_k^r, \theta_k^{r+1})$ are dominated by attacking at time close to $\theta_k^r$ or $\theta_k^{r+1}$. Thus, CASS adds new constraints to Constraints 6-11 which consider attacks to occur at $t \in (t_k, t_{k+1})$. Add one constraint for each sub-interval with respect to the possible supremum value in this sub-interval:

$$\min_{f(i,j,k), p(i,k)} v \quad (13)$$

Subject to Constraints 6-11

$$v \geq \max\{AttEU(F_q, \theta_k^{r+}), AttEU(F_q, \theta_k^{(r+1)-})\}, \forall k = 1 \ldots M, q = 1 \ldots L, r = 0 \ldots M_{qk} \quad (14)$$

This linear program stands at the core of CASS. All the linear constraints included by Constraint 14 can be added to CASS using Algorithm 1. The input of the algorithm include targets' schedules $S_q$, the protection radius $r_e$, the speed limit $v_m$, the set of discretized time points $\{t_k\}$ and the set of discretized distance points $\{d_i\}$. Function $CalInt(L_q^1, L_q^2, v_m)$ in Line 5 returns the list of all intersection time points between all possible edges $E_{i,j,k}$ and the parallel lines $L_q^1$, $L_q^2$, with additional points $t_k$ as $\theta_k^0$ and $t_{k+1}$ as $\theta_k^{M_{qk}+1}$. Function $CalCoef(L_q^1, L_q^2, v_m, \theta_k^r, \theta_k^{r+1})$ in Line 7 returns the coefficient matrix $A_{qk}^r$. Lines 8-11 add a constraint with respect to the larger value of $AttEU(F_q, \theta_k^{r+})$ and $AttEU(F_q, \theta_k^{(r+1)-})$ to CASS for this sub-interval $(\theta_k^r, \theta_k^{r+1})$.

Theorem 1. CASS computes (in polynomial time) the exact solution (minimax) of the game with discretized defender strategies and continuous attacker strategies.

Proof: According to Lemma 2, $AttEU(F_q, t)$ is piecewise linear and discontinuity can only occur at the intersection points $\theta_k^r$. These intersection points divide the time space into sub-intervals. Because of piecewise linearity, the supremum of $AttEU(F_q, t)$ equals to the limit of an endpoint of at least one sub-interval. For any defender's strategy f that is feasible, v is no less than any of the limit values at the intersection points according to Constraint 14, and thus v can be any upper bound of $AttEU(F_q, t)$ for f. As v is minimized in the objective function, v is no greater than the supremum of $AttEU(F_q, t)$ given any defender strategy f, and further v will be the infimum of the set of supremum corresponding to all defender strategies. Thus the optimal defender strategy is achieved. The total number of variables in the linear program is $O(MN^2)$ (including $f(i,j,k)$ and $p(i,k)$). The number of constraints represented in Algorithm 1 is $O(MN^2)$ as the number of intersection points is at most $2(M-1)N^2$. The number of constraints represented in Constraints 6-11 is also $O(MN^2)$. Thus, the linear program computes the solution in polynomial time.

Corollary 1. The solution of CASS provides a feasible defender strategy of the original continuous game and gives exact expected value of that strategy.

Algorithm 1: Add constraints described in Constraint 14

1  Input: $S_q$, $r_e$, $v_m$, $\{t_k\}$, $\{d_i\}$;
2  for k ← 1, … M − 1 do

-continued

| Algorithm 1: Add constraints described in Constraint 14 |
| --- |
| 3       for q ← 1, ... , L do |
| 4             $L_q^1 \leftarrow S_q + r_e$, $L_q^2 \leftarrow S_q - r_e$; |
| 5             $\theta_k^0, \ldots, \theta_k^{M_{qk}+1} \leftarrow \text{CalInt}(L_q^1, L_q^2, v_m)$; |
| 6             for r ← 0, ... , $M_{qk}$ do |
| 7                   $A_{qk}^r \leftarrow \text{CalCoef}(L_q^1, L_q^2, v_m, \theta_k^r, \theta_k^{r+1})$; |
| 8                   if $U(F_q, t)$ is decreasing in $[t_k, t_{k+1}]$ then |
| 9                       add constraint v ≥ $AttEU(F_q, \theta_k^{r+})$ |
| 10                  else |
| 11                       add constraint v ≥ $AttEU(F_q, \theta_k^{(r+1)-})$ |

-- Generalized Model

To illustrate generalization to the multiple defender resources case, two patrollers case can be taken as an example. If there are two patrollers, the patrol strategy can be represented as $\{f(i_1,j_1,i_2,j_2,k)\}$. $f(i_1,j_1,i_2,j_2,k)$ shows the probability of the first patroller moving from $d_{i_1}$ to $d_{j_1}$, and the second patroller moving from $d_{i_2}$ to $d_{j_2}$ during time $t_k$ to $t_{k+1}$, i.e., taking edge $E_{i_1,j_1,k}$ and $E_{i_2,j_2,k}$ respectively. The corresponding marginal distribution variable $p(i_1,i_2,k)$ represents for the probability that the first patroller is at $d_{i_1}$ and the second at $d_{i_2}$ at time $t_k$. Protection coefficients $C_1$ and $C_2$ are used when one or two patrollers are protecting the target respectively. So the attacker's expected utility can be written as $$AttEU(F_q,t) = (1 - (C_1\omega_1(F_q,t) + C_2\omega_2(F_q,t)))U_q(t)$$

$\omega_1(F_q,t)$ is the probability that only one patroller is protecting the target $F_q$ at time t and $\omega_2(F_q,t)$ is the probability that both patrollers are protecting the target. For attacks that happen at discretized points $t_k$, recall $I(i,q,k)$ in Definition 2. $I(i_1,q,k)+I(i_2,q,k)$ is the total number of patrollers protecting the ferry at time $t_k$.

$$\omega_1(F_q,t_k) = \Sigma_{i_1,i_2:I(i_1,q,k)+I(i_2,q,k)=1} p(i_1,i_2,k)$$

$$\omega_2(F_q,t_k) = \Sigma_{i_1,i_2:I(i_1,q,k)+I(i_2,q,k)=2} p(i_1,i_2,k)$$

Constraints for attacks occurring in $(t_k,t_{k+1})$ can be calculated with an algorithm similar to Algorithm 1, the main difference is to set the values in the coefficient matrix $A_{qk}^r(i_1,j_1,i_2,j_2)$ as $C_2$ if both edges $E_{i_1,j_1,k}$ and $E_{i_2,j_2,k}$ are between $L_q^1$ and $L_q^2$.

$$AttEU(F_q,t) = \left(1 - \sum_{i_1,j_1,i_2,j_2} A_{qk}^r(i_1,j_1,i_2,j_2)f(i_1,j_1,i_2,j_2,k)\right)U_q(t)$$

For a general case of W defender resources, $\{f(i_1,j_1,\ldots,i_W,j_W,k)\}$ is used to represent the patrol strategy and get the following equations.

$$AttEU(F_q,t) = (1 - \Sigma_{Q=1}^W C_Q \omega_Q(F_q,t))U_q(t)$$

$$\omega_Q(F_q,t_k) = \Sigma_{i_1,\ldots,i_W:\Sigma_u^W I(i_u,q,k)=Q} p(i_1,\ldots,i_W,k)$$

Q is the number of patrollers protecting the target, and $\omega_Q(F_q,t_k)$ is the probability of protection for the discretized time points $t_k$. Algorithm 1 can be modified to apply for multiple defender resource case. Set $A_{qk}^r(i_1,j_1,\ldots,i_W,j_W)$ as $C_Q$ if Q of the edges $\{E_{i_u,j_u,k}\}$ are between $L_q^1$ and $L_q^2$.

The linear program for multiple patrollers is as follows.

$$\min_{f(i_1,j_1,\ldots,i_W,j_W,k),p(i_1,\ldots,i_W,k)} v$$

$$f(i_1,j_1,\ldots,i_W,j_W,k) = 0, \forall i_1,\ldots i_W,$$
$$j_1,\ldots j_W \text{ such that } \exists u, |d_{j_u} - d_{i_u}| > v_m \delta t$$

$$p(i_1,\ldots,i_W,k) = \sum_{j_1=1}^N \ldots \sum_{j_W=1}^N f(j_1,i_1,\ldots,j_W,i_W,k-1),$$

$$\forall i_1,\ldots,i_W, \forall k > 1$$

$$p(i_1,\ldots,i_W,k) = \sum_{j_1=1}^N \ldots \sum_{j_W=1}^N f(i_1,j_1,\ldots,i_W,j_W,k),$$

$$\forall i_1,\ldots,i_W, \forall k < M$$

$$\sum_{i_1=1}^N \ldots \sum_{i_W=1}^N p(i_1,\ldots,i_W,k) = 1, \forall k$$

$$v \geq \left(1 - \sum_{G=1}^W \sum_{i_1,\ldots,i_W:\Sigma_{u=1}^W I(i_u,q,k)=G} C_G p(i_1,\ldots,i_W,k)\right) U_q(t),$$

$$\forall q, k$$

$$v \geq \left(1 - \sum_{G=1}^W C_G \omega_G(F_G,t_k)\right) U(F_q,t_k), \forall q, k$$

$$v \geq \max\{AttEU(F_q,\theta_k^{r+}), AttEU(F_q,\theta_k^{(r+1)-})\},$$

$$\forall k, q, \forall r \in [0, M_{qk}]$$

The number of variables in the linear program and the number of constraints are both $O(MN^{2W})$. While the expression grows exponentially in the number of resources, in real-world domains such as ferry protection, the number of defender resources is limited. That is the main reason that optimization using security games becomes critical. As a result, the above generalization of CASS is adequate. Indeed, CASS can run with 4 defender resources within 3 minutes for complex ferry domains. Further scale-up is an issue for future work.

Equilibrium Refinement

Figure 5A:
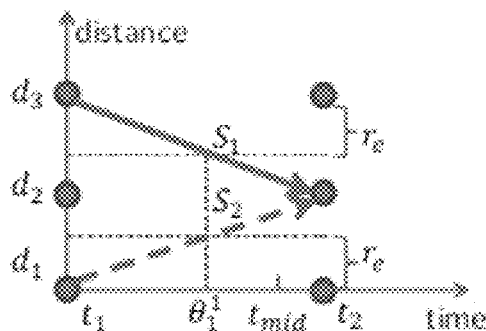
FIGS. 5A-5B illustrate an example of different equilibria for one game.

A game often has multiple equilibria. Since the game is zero-sum, all equilibria achieve the same objective value. However, if an attacker deviates from his best response, some equilibrium strategies for the defender may provide better results than others. Consider the following example game. There are two targets moving during $[t_1,t_2]$ (no further discretization), one is moving from $d_3$ to $d_2$ and the other is moving from $d_1$ to $d_2$. FIG. 5A illustrates this example.

$$d_3 - d_2 = d_2 - d_1 = d \text{ and } \frac{5d}{9} < r_e < d.$$

Figure 5B:
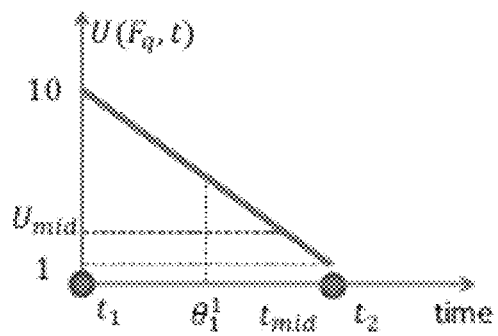

There is only one patroller available and the protection coefficient $C_1=1$. Both targets' utility functions decrease from 10 to 1 in $[t_1,t_2]$. FIG. 5B shows the utility function for both targets. In one equilibrium, $f_{3,2,1}=f_{1,2,1}=0.5$, i.e., the patroller randomly chooses one target and follows it all the way. In another equilibrium, $f_{3,3,1}=f_{1,1,1}=0.5$, i.e., the patroller either stays at $d_1$ or at $d_3$. In either equilibrium, the attacker's best response is to attack at $t_1$, with a maximum expected utility of 5. However, if an attacker is physically constrained (e.g., due to launch point locations) to only attack no earlier than $t_{mid}$, he will choose to attack at $t_{mid}$, and his expected utility is $0.5U(F_q,t_{mid})$ for the first equilibrium and $U(F_q,t_{mid})$ for the second. That is, the defender strategy in the first equilibrium is better than the one in the second.

The goal is to improve the defender strategy so that it is more robust against constrained attackers while keeping the defender's expected utility against unconstrained attackers the same. This task of selecting one from the multiple equilibria of a game is an instance of the equilibrium refinement problem, which has received extensive study in game theory, see Fudenberg, D., & Tirole, J. (1991). "*Game Theory*," MIT Press, Miltersen, P. B., & Sorensen, T. B. (2007), "*Computing proper equilibria of zero-sum games*," In Proceedings of the 5th International Conference on Computers and Games, CG'06, pp. 200-211. For finite security games, An, B., Tambe, M., Ordónez, F., Shieh, E., & Kiekintveld, C. (2011). "*Refinement of strong stackelberg equilibria in security games*," In Proceedings of the Twenty-Fifth AAAI Conference on Artificial Intelligence (AAAI), pp. 587-593, proposed techniques that provide refinement over Stackelberg equilibrium. However there has been little prior research on the computation of equilibrium refinements for continuous games.

A heuristic method named "route-adjust" is introduced for refining the equilibrium found by CASS. For expository simplicity, consider the single resource case first. Define dominance of defender strategies for $MRMT_{sg}$.

Definition 3. Defender strategy f dominates f' if $DefEU_f(F_q,t) \geq DefEU_{f'}(F_q,t), \forall q,t$, or equivalently in this zero-sum game, $AttEU_f(F_q,t) \leq AttEU_{f'}(F_q,t)$.

Corollary 2. Defender strategy f dominates f' if $\forall q,t,\omega(F_q,t) \geq \omega'(F_q,t)$.

Figure 6:
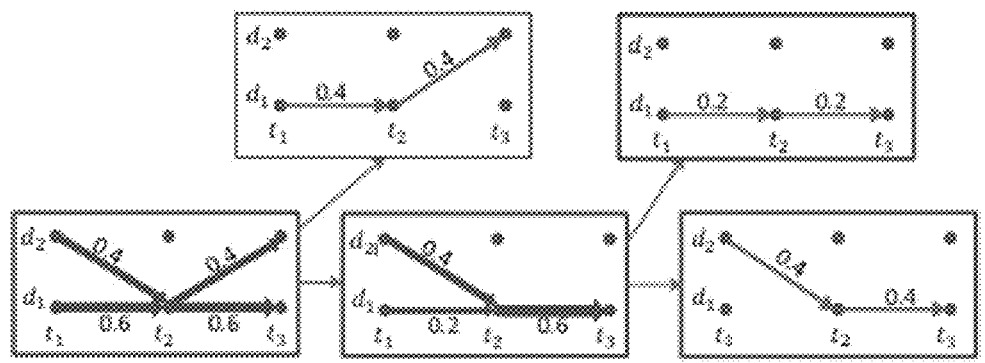
FIG. 6 illustrates an example of decomposition.

Corollary 2 follows from Equation (2). Starting with a defender strategy $f^0$ calculated by CASS, route-adjust provides final routes using these steps: (i) decompose flow distribution $f^0$ into component routes; (ii) for each route, greedily find a route which provides better protection to targets; (iii) combine the resulting routes into a new flow distribution, $f^1$, which dominates $f^0$. To accomplish step (i), decompose the flow distribution by iteratively finding a route that contains the edge with minimum probability. FIG. 6 shows an example of the decomposition process. As shown in FIG. 6, a route that contains edge $E_{1,2,2}$ is chosen as $f(1,2,2)=0.4$ is the minimum among all flow variables. Choose $R_2=(d_1.d_1.d_2)$, and $setp(R_2)=f(1,2,2)=0.4$. Then the route is subtracted from the original flow distribution to get a residual graph. Continue to extract routes from the residual graph until there is no route left. Assume in the flow distribution graph, the number of non-zero terms is Z, Z is decreased by at least 1 after each iteration. So the algorithm will terminate in at most Z steps and at most Z routes are found.

For step (ii), adjust each of the routes greedily. To that end, the (weak) dominance relation of edges and routes are introduced, using the intersection points $\theta_k^r$ and the coefficient matrix $A_{qk}^r(i,j)$.

Definition 4. Edge $E_{i,j,k}$ dominates edge $E_{i',j',k}$ in $[t_k,t_{k+1}]$ if $A_{qk}^r(i,j) \geq A_{qk}^r(i',j'), \forall q=1 \ldots L, \forall r=1 \ldots M_{qk}$, i.e., edge $E_{i,j,k}$ protects target $F_q$ in $[\theta_k^r, \theta_k^{r+1}]$ if edge $E_{i',j',k}$ protects it.

Definition 5. Route $R_u=(d_{R_u(1)}, \ldots, d_{R_u(M)})$ dominates $R_{u'}=(d_{R_{u'}(1)}, \ldots, d_{R_{u'}(M)})$ if $E_{R_u(k),R_u(k+1),k}$ dominates edge $E_{R_{u'}(k),R_{u'}(k+1),k}, \forall k=1 \ldots M-1$, i.e., route $R_u$ dominates $R_{u'}$ if each edge of $R_u$ dominates the corresponding edge in $R_{u'}$.

Denote the original route to be adjusted as $R_u$ and the new route as $R_{u_1}$. A greedy way to improve the route is to replace only one node in the route, i.e., $R_{u_1}(k)=R_u(k), \forall k \neq k^*$ and $d_{R_u(k^*)}$ in the original route is replaced with $$d_{R_{u_1}(k^*)}.$$

So the patroller's route changes only in $[t_{k^*-1},t_{k^*+1}]$. To simplify the notation, denote the edge $E_{R_u(k^*),R_u(k^*+1),k^*}$ as $E(u,k^*)$. Thus, only edges $E(u,k^*-1)$ and $E(u,k^*)$ in the original route are replaced by $E(u_1,k^*-1)$ and $E(u_1,k^*)$ in the new route. $R_{u_1}$ needs to provide more protection to the targets, so the new route should dominate the original one. So for a specified $k^*$, a position $$d_{R_{u_1}(k^*)}$$

is needed such that: 1) $E(u_1,k^*-1)$ and $E(u_1,k^*)$ meet the speed constraint; 2) $E(u_1,k^*-1)$ and $E(u_1,k^*)$ dominates $E(u,k^*-1)$ and $E(u,k^*)$ respectively; 3) edge $E(u_1,k^*-1)$ and $E(u_1,k^*)$ are not dominated by the corresponding edges for any other choice of $$d_{R_{u_1}(k^*)}.$$

The second requirement ensures the changed edges in the new route dominate the corresponding edges in the original route. Thus the new route $R_{u_1}$ dominates $R_u$. The third requirement attains a local maxima. Iterate this process and it converges to a final route denoted $R_{u'}$.

For the example above, assume the target's moving schedule is $d_1 \to d_1 \to d_2$, $d_3-d_2=d_2-d_1=\delta d$, $r_e=0.1\delta d$ and utility function is constant. Each route can be improved by changing the patroller's position at time $t_3$, i.e., $R_u(3)$. As $t_3$ is the last discretized time point, only edge $E_{i,j,2}$ may be changed. The adjustment is shown in Table 2.

TABLE 2

An example to show how the routes are adjusted

| Original | Adjusted | $p(R_u)$ |
|---|---|---|
| $(d_1, d_1, d_1)$ | $(d_1, d_1, d_2)$ | 0.2 |
| $(d_1, d_1, d_2)$ | $(d_1, d_1, d_2)$ | 0.4 |
| $(d_2, d_1, d_1)$ | $(d_2, d_1, d_2)$ | 0.4 |
| $(d_2, d_1, d_2)$ | — | 0 |

For step (iii), a new compact representation is constructed as in Equation 1. For the example above, the result is shown in Table 2.

Theorem 2. After steps (i)-(iii), a new defender strategy $f^1$ that dominates the original one $f^0$ is achieved.

While step (iii) is used to prove Theorem 2, notice that at the end of step (ii), a probability distribution over a set of routes is achieved from which actual patrol routes can be sampled. For two or more defender resources, simply generalize the dominance relation to the edge tuple $(E_{i_1,j_1,k}, \ldots, E_{i_W,j_W,k})$ with coefficient matrix for multiple patrollers $A_{qk}^r(i_1,j_1, \ldots, i_W,j_W)$.

Evaluation

An example setting in the ferry protection domain is used and the performance is compared in terms of the attacker's expected utility $AttEU(F_q,t)$. As it is a zero-sum game, a lower value of AttEU indicates a higher value of defender's expected utility.

Figure 7A:
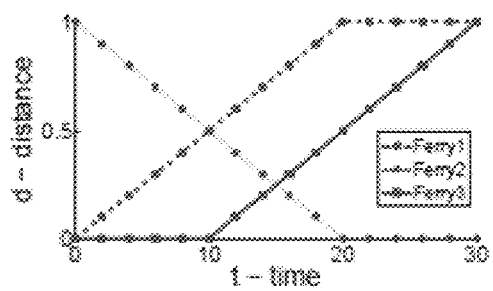
FIGS. 7A-7H illustrate experimental settings and results.

The following setting is used for the experiments, illustrating that this is a complex spatio-temporal game; rather than a discrete security game as in most previous work. There are three ferries moving between terminals A and B and the total distance AB=1. The simulation time is 30 minutes. The schedules of the ferries are shown in FIG. 7A, where the x-axis indicates the time and the y-axis is the distance from terminal A. Ferry 1 and Ferry 3 are moving from A to B while Ferry 2 is moving from B to A. Results with 2 patrollers (where $C_1=0.8$, and $C_2=1.0$) are shown first, and results with more patrollers are shown later.

Figure 7B:
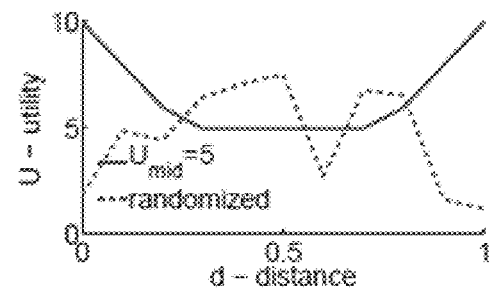
Figure 7C:
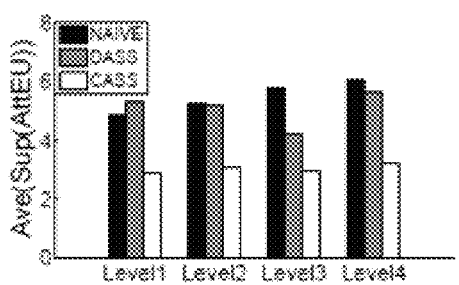

Performance of CASS. The strategies calculated by CASS with DASS are compared against a baseline strategy. In the baseline strategy, the two patrollers choose a ferry with a probability of 1/3 (uniformly random) and move alongside it to offer it full protection, leaving the other two unprotected (strategy observed in practice). First a stress test is applied to CASS by using more complex utility functions than in the realistic case that follows. Therefore, the test is conducted under 4 different discretization levels (e.g., at level 1, M=4,N=3, and at level 4, M=16, and N=11) with random utilities, and at each discretization level, 20 problem instances are created. Each instance has utilities uniformly randomly chosen between [0,10] at discretized points; an example is shown in dashed lines of FIG. 7B. The x-axis indicates the distance d from terminal A, the y-axis indicates the utility of a successful attack if the ferry is located at distance d. In FIG. 7C, x-axis plots the four discretization levels. y-axis plots the average attacker utility over the 20 instances for baseline, DASS and CASS. CASS is shown to outperform DASS and baseline (p<0.01).

Figure 7D:
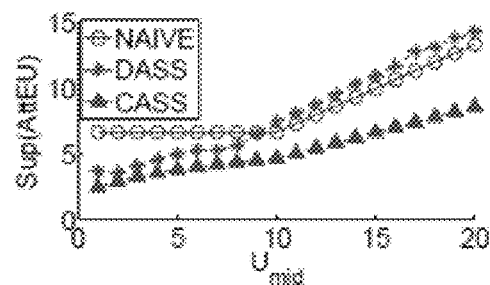
Figure 7E:
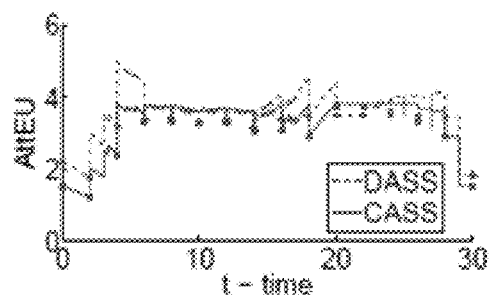

Next tests are run with more realistic utility function in this ferry domain, which is of U-shape or inverse U-shape. The solid line in FIG. 7B shows a sample utility curve where the attacker gains higher utility closer to the shore. In FIG. 7D, the utility at the shore is fixed as 10, vary the utility in the middle (the floor of the U-shape or the top of the inverse U-shape), shown on x-axis and compare performance of the strategies in terms of attacker utility on the y-axis. From the results, it can be concluded that 1) The strategy calculated by CASS outperforms the baseline and DASS. 2) DASS may actually achieve worse results than the baseline. FIG. 7E gives a more detailed analysis for the one instance (shown in FIG. 7B with solid line). The x-axis indicates the time t, and the y-axis indicates the attacker's expected utility if he attacks Ferry 1 at time t. For the strategy calculated by DASS the worst performance at discretized time points is $3.50(AttEU(F_1, 20))$, however, the supremum of $AttEU(F_1, t), t \in [0,30]$ can be as high as 4.99 ($AttEU(F_1,4^+)$), which experimentally shows that taking into consideration the attacks between the discretized time points is necessary. For the strategy calculated by CASS the supremum of AttEU $(F_1,t)$ is reduced to 3.82.

Figure 8A:
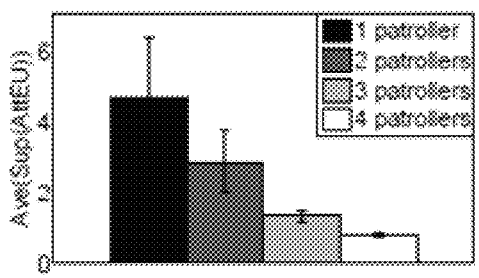
FIGS. 8A-8B illustrate performance with varying number of patrollers.
Figure 8B:
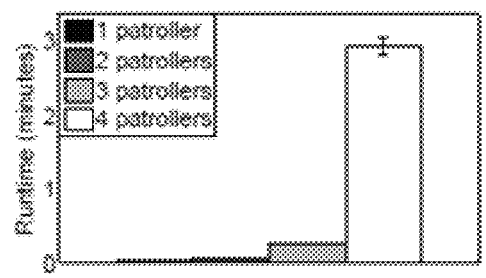

Number of Patrollers. FIG. 8A shows the improvement in performance of CASS with increasing number of patrollers. The x-axis shows the number of patrollers and the y-axis indicates the average of supremum of attacker's expected utility. The results are averaged over the 20 random utility settings for discretization level 1 from FIG. 7C (only 1 level is shown due to space limit). With less patrollers, the performance of the defender varies a lot depending on the randomized utility function (higher variance). But the variance gets much smaller with more patrollers, which means the defender has sufficient resources for different instances. FIG. 8B shows the run-time for CASS.

Figure 7F:
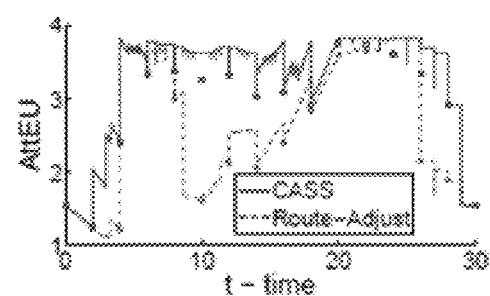
Figure 7G:
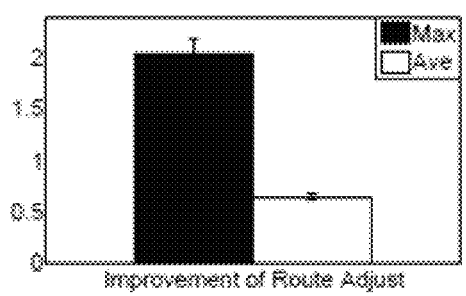

Improvement Using Refinement Methods. In FIG. 7F, the $AttEU(F_1,t)$ function of the defender strategy given by CASS and the defender strategy after equilibrium refinement for Ferry 1 are compared for just one instance described in FIG. 7B (solid line). In route-adjust, every node of the route is replaced one-by-one and the process is repeated five times. The figure shows for an attack aiming at any target at any time, the defender strategy after refinement is equally good or better than the one in the original equilibrium. FIG. 7G shows the maximum and the average improvement of refinement over 15 randomized instances for FIG. 7C, which confirms the refinement eliminates the weakly dominated defender strategy calculated by CASS and provides a better defender strategy in terms of possible constrained attackers.

Figure 7H:
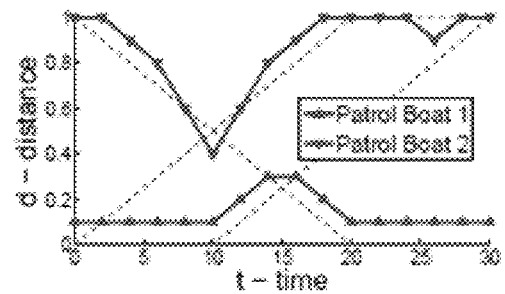

Sampled Routes. A pair of sampled routes for two patrollers for the defender strategy after route-adjust step (ii) are shown in FIG. 7H. The x-axis indicates the time and the y-axis is the distance to terminal A. The solid lines show the escorts' patrol routes and the dashed lines show the ferries' schedules.

Another Approach for Equilibrium Refinement

Whereas route-adjust tries to select an equilibrium that is robust against attackers playing suboptimal strategies, the second approach, flow-adjust, attempts to select a new equilibrium that is robust to rational attackers that are constrained to attack during any time interval $[t_k,t_{k+1}]$. As we will discuss below, flow-adjust focuses on a weaker form of dominance, which implies that a larger set of strategies are now dominated (and thus could potentially be eliminated) compared to the standard notion of dominance used by route-adjust; however flow-adjust does not guarantee the elimination of all such dominated strategies. We denote by $DefEU_f^k$ (the defender expected utility when an attacker is constrained to attack during time interval $[t_k,t_{k+1}]$ when the attacker provides his best response given the defender strategy f. Formally, $DefEU_f^k = \min_{q \in \{1 \ldots L\}, t \in [t_k,t_{k+1}]} \{DefEU_f(F_q,t)\}$. We give the following definition of "local dominance".

Definition 6. Defender strategy f locally dominates f' if $DefEU_f^k \geq DefEU_{f'}^k, \forall k$.

Corollary 3. Defender strategy f locally dominates f' if $$\min_{q \in \{1 \ldots L\}, t \in [t_k,t_{k+1}]} \{DefEU_f(F_q, t)\} \geq \min_{q \in \{1 \ldots L\}, t \in [t_k,t_{k+1}]} \{DefEU_{f'}(F_q, t)\}, \forall k$$

or equivalently in this zero-sum game, $$\min_{q \in \{1 \ldots L\}, t \in [t_k,t_{k+1}]} \{AttEU_f(F_q, t)\} \geq \min_{q \in \{1 \ldots L\}, t \in [t_k,t_{k+1}]} \{AttEU_{f'}(F_q, t)\}, \forall k$$

Corollary 3 follows from the fact that the attacker plays a best response given the defender strategy, and it means that f locally dominates f' if the maximum of attacker expected utilities in each time interval $[t_k,t_{k+1}]$ given f is no greater than that of f'.

Compared to Definition 6, which gives the standard condition for dominance, local dominance is a weaker condition; that is, if f dominates f' then f locally dominates f', however the converse is not necessarily true. Intuitively, whereas in Definition 6 the attacker can play any (possibly suboptimal) strategy, here the attacker's possible deviations from best response are more restricted. As a result, the set of locally dominated strategies includes the set of dominated strategies. From Definition 6, if f locally dominates f', and the attacker is rational (i.e., still playing a best response) but constrained to attack during some time interval $[t_k, t_{k+1}]$, then f is preferable to f' for the defender. A further corollary is that even if the rational attacker is constrained to attack in the union of some of these intervals, f is still preferable to f' if f locally dominates f'. One intuition for the local dominance concept is the following: suppose we suspect the attacker will be restricted to a (unknown) subset of time, due to some logistical constraints. Such logistical constraints would likely make the restricted time subset to be contiguous or a union of a small number of contiguous sets. Since such sets are well-approximated by unions of intervals $[t_k, t_{k+1}]$, local dominance can serve as an approximate notion of dominance with respect to such attackers.

Figure 9A:
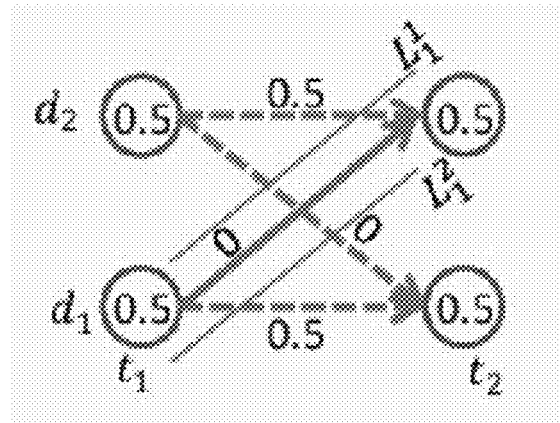
FIGS. 9A and 9B show examples of flow adjust.
Figure 9B:
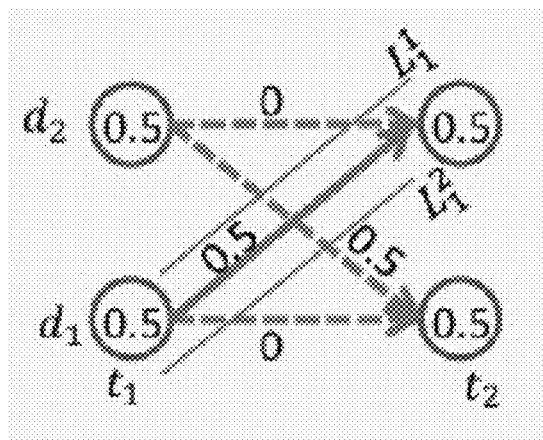

Flow-adjust looks for a defender strategy $f^1$ that locally dominates the original defender strategy $f^0$. To achieve this, we simply adjust the flow distribution variables f(i,j,k) while keeping the marginal probabilities p(i,k) the same. FIGS. 9A and 9B show an example of flow adjust; FIG. 9A shows one defender strategy $f^0$ where the patroller is taking edges $E_{1,1,1}$ and $E_{2,2,1}$ with probability 0.5 and FIG. 9B shows another defender strategy $f^1$ where the patroller is taking edges $E_{1,2,1}$ and $E_{2,1,1}$ with probability 0.5. FIGS. 9A and 9B represent an example game with two discretized intervals $[t_1,t_2]$ and $[t_2,t_3]$, (only the first interval is shown). Suppose the maximal attacker expected utility is $5U_0$ in this equilibrium and is attained in the second interval $[t_2,t_3]$. If the attacker's utility for success is a constant $U_0$ in the first interval $[t_1,t_2]$, then the defender strategy in $[t_1,t_2]$ could be arbitrarily chosen because the attacker's expected utility in $[t_1,t_2]$ in worst case is smaller than that of the attacker's best response in $[t_2,t_3]$. However, if an attacker is constrained to attack in $[t_1,t_2]$ only, the defender strategy in the first interval will make a difference. In this example, there is only one target moving from $d_1$ to $d_2$ during $[t_1,t_2]$. The schedule of the ferry is shown as dark lines and the parallel lines $L_1^1$ and $L_1^2$ with respect to protection radius $r_e=0.2(d_2-d_1)$ are shown as dashed lines. The marginal distribution probabilities p(i,k) are all 0.5 and protection coefficient $C_1=1$. In $f^0$, the defender's strategy is taking edges $E_{1,1,1}$ and $E_{2,2,1}$ with probability 0.5 and the attacker's maximum expected utility is $U_0$, which can be achieved around time $(t_1+t_2)/2$ when neither of the two edges $E_{1,1,1}$ and $E_{2,2,1}$ are within the target's protection range. If we adjust the flows to edge $E_{1,2,1}$ and $E_{2,1,1}$, as shown in FIG. 9B, the attacker's maximum expected utility in $[t_1,t_2]$ is reduced to $0.5U_0$ as edge $E_{1,2,1}$ is within the target's protection range all the way. So a rational attacker who is constrained to attack between $[t_1,t_2]$ will get a lower expected utility given defender strategy $f^1$ than given $f^0$, and thus the equilibrium with $f^1$ is more robust to this kind of deviation on the attacker side.

So in flow-adjust, we construct M−1 new linear programs, one for each time interval $[t_{k^*}, t_{k^*+1}]$, $k^*=1\ldots M-1$ to find a new set of flow distribution probabilities f(i,j,k*) to achieve the lowest local maximum in $[t_{k^*}, t_{k^*+1}]$ with unchanged p(i,k*) and p(i,k*+1). The linear program for an interval $[t_{k^*}, t_{k^*+1}]$ is shown below.

$$\min_{f(i,j,k^*)} v$$

$$f(i, j, k^*) = 0, \text{ if } |d_j - d_i| > v_m \delta t$$

$$p(i, k^* + 1) = \sum_{j=1}^{n} f(j, i, k^*), \forall i \in \{1 \ldots n\}$$

$$p(i, k^*) = \sum_{j=1}^{n} f(i, j, k^*), \forall i \in \{1 \ldots n\}$$

$$v \geq AttEU(F_q, t_k), \forall q \in \{1 \ldots L\}, k \in \{k^*, k^*+1\}$$

$$v \geq \max\{AttEU(F_q, \theta_{qk^*}^{r+}), AttEU(F_q, \theta_{qk^*}^{(r+1)-})\},$$

$$\forall q \in \{1 \ldots L\}, r \in \{0 \ldots M_{qk^*}\}$$

While the above linear program appears similar to the linear program of CASS, they have significant differences. Unlike CASS, the marginal probabilities p(i,k*) here are known constants and are provided as input and as mentioned above, there is a separate program for each interval $[t_{k^*}, t_{k^*+1}]$. Thus, we get f(i,j,k*) such that the local maximum in $[t_{k^*}, t_{k^*+1}]$ is minimized. Denote the minimum as $v_{k^*}^1$. From the original flow distribution $f^0$, we get $AttEU_{f^0}(F_q,t)$ and we denote the original local maximum value in $[t_{k^*}, t_{k^*+1}]$ as $v_{k^*}^0$. As the subset {f(i,j,k*)} of the original flow distribution $f^0$ is a feasible solution of the linear program above, we have $v_{k^*}^1 \leq v_{k^*}^0$, noting that the equality happens for the interval from which the attacker's best response is chosen.

Note that any change made to f(i,j,k) in an interval $[t_{k^*}, t_{k^*+1}]$ will not affect the performance of f in other intervals as the marginal probabilities p(i,k) are kept the same, i.e., changing f(i,j,k*) based on the linear program above is independent from any change to f(i,j,k), k≠k*. So we can solve the M−1 linear programs independently. After calculating f(i,j,k*) for all k*=1 ... M−1, we can get the new defender strategy $f^1$ by combining the solutions f(i,j,k*) of the different linear programs together. As $v_{k^*}^1 \leq v_{k^*}^0$, we have $$\min_{q \in \{1 \ldots L\}, t \in [t_{k^*}, t_{k^*+1}]} \{AttEU_{f^0}(F_q, t)\} \geq$$

$$\min_{q \in \{1 \ldots L\}, t \in [t_{k^*}, t_{k^*+1}]} \{AttEU_{f^1}(F_q, t)\},$$

$$\forall k^* = 1 \ldots M-1$$

Thus, $f^1$ locally dominates $f^0$.

On the other hand, while we have restricted the strategies to have the same p(i,k), there may exist another strategy $f^2$ with a different set of p(i,k) that locally dominates $f^1$. Finding locally dominating strategies with different p(i,k) from the original is a topic of future research.

Although the two refinement approaches we provide do not necessarily lead to a non-dominated strategy under the corresponding dominance definition, these two approaches are guaranteed to find a more robust (or at least indifferent) equilibrium when faced with constrained attackers compared to the original equilibrium we obtain from CASS. Clearly, these two refinement approaches do not exhaust the space of refinement approaches—other refinement approaches are possible that may lead to other equilibria that are better than (e.g., dominate) the one found by CASS. However, it is likely that different defender strategies resulting from different equilibrium refinements are not comparable to each other in terms of dominance, i.e., with some constrained attackers, one equilibrium might turn out to be better and with other constrained attackers, another equilibrium might be better. Their computational costs may differ as well. Thus, understanding this space of refinement approaches in terms of their computational cost and output quality, and determining which approach should be adopted under which circumstances is an important challenge for future work.

Extension to Two-Dimensional Space

Figure 10:
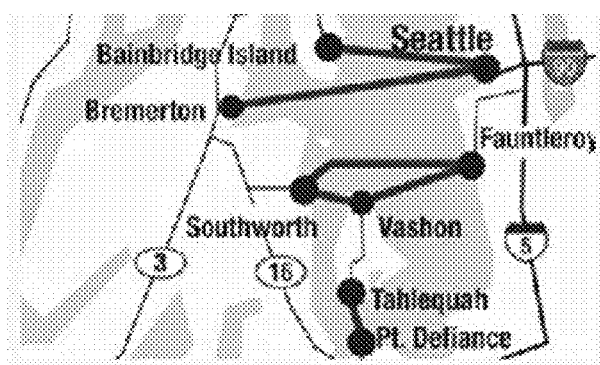
FIG. 10 shows a part of the route map of Washington State Ferries, where there are several ferry trajectories.

Both DASS and CASS are based on the assumption that both the targets and the patrollers move along a straight line. However, a more complex model is needed in some practical domains. For example, FIG. 10 shows a part of the route map of Washington State Ferries, where there are several ferry trajectories. If a number of patroller boats are tasked to protect all the ferries in this area, it is not necessarily optimal to simply assign a ferry trajectory to each of the patroller boat and calculate the patrolling strategies separately according to CASS. As the ferry trajectories are close to each other, a patrolling strategy that can take into account all the ferries in this area will be much more efficient, e.g., a patroller can protect a ferry moving from Seattle to Bremerton first, and then change direction halfway and protect another ferry moving from Bainbridge Island back to Seattle.

In this section, the previous model is extended to a more complex case, where the targets and patrollers move in a two-dimensional space and provide the corresponding linear-program-based solution. Again we use a single defender resource as an example, and generalize to multiple defenders at the end of this section.

As in the one-dimensional case, the time and space may be discretized for the defender to calculate the defender's optimal strategy. The time interval T is discretized into a set of time points $T=\{t_k\}$. Let $G=(V, E)$ represents the graph where the set of vertices V corresponds to the locations that the patrollers may be at, at the discretized time points in T, and E is the set of feasible edges that the patrollers can take. An edge $e \in E$ satisfies the maximum speed limit of patroller and possibly other practical constraints (e.g., a small island may block some edges).

When the attack only occurs at the discretized time points, the linear program of DASS and described earlier can be applied to the two-dimensional settings when the distance in Constraint 7 is substituted with Euclidean distance in 2-D space of nodes $V_i$ and $V_j$.

$$\min_{f(i,j,k),p(i,k)} v$$

$$f(i, j, k) \in [0, 1], \forall i, j, k$$

$$f(i, j, k) = 0, \forall i, j, k \text{ such that } \|V_j - V_i\| > v_m \delta t$$

$$p(i, k) = \sum_{j=1}^{N} f(j, i, k-1), \forall i, \forall k > 1$$

$$p(i, k) = \sum_{j=1}^{N} f(i, j, k), \forall i, \forall k < M$$

$$\sum_{i=1}^{N} p(i, k) = 1, \forall k$$

$$v \geq AttEU(F_q, t_k), \forall q, k$$

Note that $f(i,j,k)$ now represents the probability that a patroller is moving from node $V_i$ to $V_j$ during $[t_k,t_{k+1}]$. Recall in FIG. 1B, a patroller protects all targets within her protective circle of radius $r_e$. However, in the one-dimensional space, we only care about the straight line AB, so we used $\beta_q(t)=[\max\{S_q(t)-r_e,d_1\},\min\{S_q(t)+r_e,d_N\}]$ as the protection range of target $F_q$ at time t, which is in essence a line segment. In contrast, here the whole circle needs to be considered as the protection range in the two-dimensional space and the extended protection range can be written as $\beta_q(t)=\{V=(x,y):\|V-S_q(t)\|\leq r_e\}$. This change affects the value of $I(i,q,k)$ and thus the value of $AttEU(F_q,t_k)$ in the last constraint above.

When the attacking time t can be chosen from the continuous time interval T, we need to analyze the problem in a similar way as the sub-interval analysis described earlier. The protection radius is $r_e$, which means only patrollers located within the circle whose origin is $S_q(t)$ and radius is $r_e$ can protect target $F_q$. As we assume that the target will not change its speed and direction during time $[t_k,t_{k+1}]$, the circle will also move along a line in the 2-D space. If the circle is tracked in a 3-D space where the x and y axes indicate the position in 2-D and the z axis is the time, an oblique cylinder results, which is similar to a cylinder except that the top and bottom surfaces are displaced from each other (see FIG. 11). When a patroller moves from vertex $V_i(\in V)$ to vertex $V_j$ during time $[t_k,t_{k+1}]$, she protects the target only when she is within the surface. In the 3-D space described above, the patroller's movement can be represented as a straight line.

Figure 11:
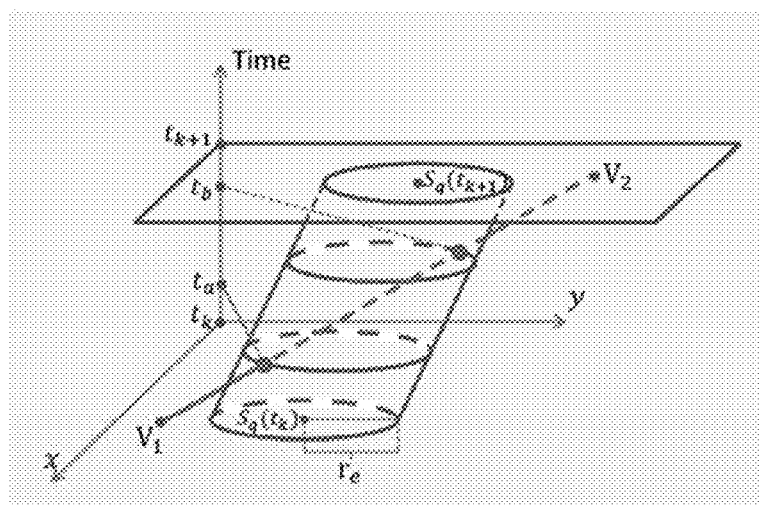
FIG. 11 provides an illustration of the calculation of intersection points in the two-dimensional setting.

FIG. 11 provides an illustration of the calculation of intersection points in the two-dimensional setting. The x and y axes indicates the position in 2-D and the z axis is the time. To simplify the illustration, z axis starts from time $t_k$. In this example, there are two intersection points occurring at time points $t_a$ and $t_b$.

Intuitively, there will be at most two intersection points between the patroller's route in 3-D space and the surface. This can be proved by analytically calculating the exact time of these intersection points. Assume the patroller is moving from $V_1=(x_1,y_1)$ to $V_2=(x_2,y_2)$ and the target is moving from $S_q(t_k)=(\hat{x}_1,\hat{y}_1)$ to $S_q(t_{k+1})=(\hat{x}_2,\hat{y}_2)$ during $[t_k,t_{k+1}]$ (an illustration is shown in FIG. 11). To get the time of the intersection points, we solve a quadratic equation with these coordination parameters and protection radius $r_e$. The detailed calculation is as follows:

Denote the patroller's position at a given time $t\in[t_k,t_{k+1}]$ by $(x, y)$ and the target's position is denoted as $(\hat{x},\hat{y})$. Then we have $$x = \frac{t-t_k}{t_{k+1}-t_k}(x_2 - x_1) + x_1, \quad y = \frac{t-t_k}{t_{k+1}-t_k}(y_2 - y_1) + y_1$$

$$\hat{x} = \frac{t-t_k}{t_{k+1}-t_k}(\hat{x}_2 - \hat{x}_1) + \hat{x}_1, \quad \hat{y} = \frac{t-t_k}{t_{k+1}-t_k}(\hat{y}_2 - \hat{y}_1) + \hat{y}_1$$

At an intersection point, the distance from the patroller's position to the target's position equals to the protection radius $r_e$, so we are looking for a time t such that $$(x-\hat{x})^2+(y-\hat{y})^2=r_e^2$$

By substituting the variables and denoting $$A_1 = \frac{(x_2-x_1)-(\hat{x}_2-\hat{x}_1)}{t_{k+1}-t_k}, \quad B_1 = x_1 - \hat{x}_1$$

$$A_2 = \frac{(y_2-y_1)-(\hat{y}_2-\hat{y}_1)}{t_{k+1}-t_k}, \quad B_2 = y_1 - \hat{y}_1$$

We get $$(A_1t-A_1t_k+B_1)^2+(A_2t-A_2t_k+B_2)^2=r_e^2$$

Denote $C_1=B_1-A_1t_k$ and $C_2=B_2-A_2t_k$, and we can easily get the two roots of this quadratic equation, which are $$t_{a,b} = \frac{-2(A_1C_1+A_2C_2) \pm 2\sqrt{(A_1C_1+A_2C_2)^2 - (A_1^2+A_2^2)(C_1^2+C_2^2-r_e^2)}}{2(A_1^2+A_2^2)}$$

If a root of the quadratic equation is within the interval $[t_k,t_{k+1}]$, it indicates that the patroller's route intersects with the surface at this time point. So there will be at most two intersection points. Once we find all these intersection points, the same sub-interval analysis applies and we can again claim Lemma 1. So we conclude that we only need to consider the attacker's strategies at these intersection points. We use the same notation $\theta_{qk}^r$ as in the one-dimensional case to denote the sorted intersection points and get the following linear program for the 2-D case.

$$\min_{f(i,j,k),p(i,k)} v$$

Subject to Constraints Describes in DASS for 2-D Case $$v \geq \max\{AttEU(F_q,\theta_{qk}^{r,+}), AttEU(F_q,\theta_{qk}^{(r+1)-})\},$$
$$\forall k \in \{1 \ldots M\}, q \in \{1 \ldots L\}, r \in \{0 \ldots M_{qk}\}$$

Algorithm 1 can still be used to add constraints to the linear program of CASS for the 2-D case. The main difference compared to CASS in the 1-D case is that since Euclidean distance in 2-D is used, the extended definition of $\beta_q(t)$ in 2-D is used when deciding the entries in the coefficient matrix $A_{qk}^r(i,j)$.

For multiple defender resources, again the linear program described earlier is applicable when the extended definition of $\beta_q(t)$ is used to calculate AttEU and Euclidean distance is used in the speed limit constraint, i.e., $$f(i_1,j_1,\ldots,i_W,j_W,k)=0, \forall i_1,\ldots i_W,j_1,\ldots j_W, \text{ such that } \exists u, \|V_{j_u}-V_{i_u}\| > v_m \delta t$$

Route Sampling

We have discussed how to generate an optimal defender strategy in the compact representation; however, the defender strategy will be executed as taking a complete route. So we need to sample a complete route from the compact representation. In this section, we give two methods of sampling and show the corresponding defender strategy in the full representation when these methods are applied.

The first method is to convert the strategy in the compact representation into a Markov strategy. A Markov strategy in our setting is a defender strategy such that the patroller's movement from $t_k$ to $t_{k+1}$ depends only on the location of the patroller at $t_k$. We denote by $\alpha(i,j,k)$ the conditional probability of moving from $d_i$ to $d_j$ during time $t_k$ to $t_{k+1}$ given that the patroller is located at $d_i$ at time $t_k$. In other words $\alpha(i,j,k)$ represents the chance of taking edge $E_{i,j,k}$ given that the patroller is already located at node $(t_k, d_i)$. Thus, given a compact defender strategy specified by $f(i,j,k)$ and $p(i,k)$, we have $$\alpha(i,j,k) = \frac{f(i,j,k)}{p(i,k)}, \text{ if } p(i,k) > 0$$

$\alpha(i,j,k)$ can be an arbitrary number if $p(i,k)=0$. We can get a sampled route by first determining where to start patrolling according to $p(i,1)$; then for each $t_k$, randomly choose where to go from $t_k$ to $t_{k+1}$ according to the conditional probability distribution $\alpha(i,j,k)$. The distribution from this sampling procedure matches the given marginal variables as each edge $E_{i,j,k}$ is sampled with probability $p(i,k)\alpha(i,j,k)=f(i,j,k)$. This sampling method actually leads to a full representation where route $R_u=(d_{r_u(1)}, d_{r_u(2)}, \ldots, d_{r_u(M)})$ is sampled with probability $(r_u(1),1) \prod_{k=1}^{M-1} \alpha(r_u(k),(k+1),k)$, the product of the probability of the initial distribution and the probability of taking each step. This method is intuitively straightforward and the patrol route can be decided online during the patrol, i.e., the position of the patroller at $t_{k+1}$ is decided when the patroller reaches its position at $t_k$, which makes the defender strategy more unpredictable. The downside of the method is that the number of routes chosen with non-zero probability can be as high as $N^M$. For 2-D case, the patroller is located at node $V_i$ at time $t_k$. The sampling process is exactly the same when $\alpha(i,j,k)$ is used to denote the probability of moving from $V_i$ to $V_j$ during $[t_k,t_{k+1}]$.

The second method of sampling is based on the decomposition process in route-adjust. As we discussed above for the first sampling method, sampling is essentially restoring a full representation from the compact representation. As shown in FIG. 2B, there are multiple ways to assign probabilities to different routes and the decomposition process of "route-adjust" constructively defines one of them. So we can make use of the information we get from the process, and sample a route according to the probability assigned to each decomposed route. The number of routes chosen with non-zero probability is at most $N^2M$, much less than the first method and thus it becomes feasible to describe the strategy in full representation, by only providing the routes that are chosen with positive probability. Different sampling approaches may be necessitated by different application requirements. Some applications might require that the defender obtain a strategy in full representation and only be presented a small number of pure strategies. However, for other applications, a strategy that can be decided on-line, potentially with a hand-held smartphone may be preferred. Therefore, based on the needs of the application, different sampling strategies might be selected.

DASS with Constrained Discretization in Time Space

When the set of time points $\{t_1, t_2, \ldots t_M\}$ that the attacker may potentially perform an attack is given (not necessarily evenly distributed in time space), we can use the following variation of DASS to fit such case:

$$\min_{f(i,j,k),p(i,k)} v$$

$$f(i,j,k) \in [0,1], \forall i,j,k$$

$$f(i,j,k) = 0, \forall i,j,k \text{ such that } |d_j - d_i| > v_m(t_{k+1}-t_k)$$

$$p(i,k) = \sum_{j=1}^{N} f(j,i,k-1), \forall i, \forall k > 1$$

$$p(i,k) = \sum_{j=1}^{N} f(i,j,k), \forall i, \forall k < M$$

-continued $$\sum_{i}^{N} p(i,k) = 1, \forall k$$

$$v \geq AttEU(F_q, t_k), \forall q, k$$

The main difference is for the speed limit constraint, we take into consideration the different length of the intervals $[t_k, t_{k+1}]$.

SUMMARY

Computing optimal strategies given moving targets and mobile patrollers may have for following features: (i) $MRMT_{sg}$, a game model with continuous attacker strategy set; (ii) a fast solution approach, CASS, based on compact representation and sub-interval analysis; and (iii) a heuristic method for equilibrium refinement for CASS's solutions; and (iv) detailed experimental analysis in the ferry protection domain.

Unless otherwise indicated, the various algorithms that have been discussed are implemented with a computer system configured to perform the algorithms. The computer system includes one or more processors, tangible memories (e.g., random access memories (RAMs), read-only memories (ROMs), and/or programmable read only memories (PROMS)), tangible storage devices (e.g., hard disk drives, CDDVD drives, and/or flash memories), system buses, video processing components, network communication components, input/output ports, and/or user interface devices (e.g., keyboards, pointing devices, displays, microphones, sound reproduction systems, and/or touch screens).

The various data that is used in the algorithms may be stored in a computer-readable memory system that may include one or more random access memories (RAMs), read-only memories (ROMs), programmable read only memories (PROMS), and/or tangible storage devices (e.g., hard disk drives, CD/DVD drives, and/or flash memories).

The computer system may be a desktop computer or a portable computer, such as a laptop computer, a notebook computer, a tablet computer, a PDA, a smartphone, or part of a larger system, such a vehicle, appliance, and/or telephone system.

The computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, when a set of time points that an attacker may potentially perform an attack is given (not necessarily evenly distributed in time space) and targets are moving in two-dimensional space, the proposed algorithm for two-dimensional space and for constrained discretization in time space can be combined together by taking into consideration both the Euclidean distance and the length of the time interval in the speed limit constraint.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A method for scheduling locations of mobile defense resources for protecting a plurality of targets, a mobile defense resource being separate from a target, the method comprising:
    obtaining, from a memory, a target schedule for each target of a plurality of moving targets, the target schedule being a set of different times having an associated location for each target, each target of the plurality of moving targets being a potential candidate for an attack by one or more mobile attackers having an ability to attack the target;
    obtaining, from the memory, a specification of each mobile defense resource of a plurality of mobile defense resources having an ability to defend the target against the attack, the specification including a movement speed and a protection radius;
    determining, by a processor, a plurality of possible locations for each mobile defense resource at any of the times within the set of different times;
    determining, by the processor, a plurality of potential paths for each mobile defense resource, each potential path being based on a series of combinations of times from the set of different times and locations from the set of possible locations;
    determining, by the processor, a plurality of defense schedules, each defense schedule having, for each mobile defense resource, a path from the plurality of potential paths;
    determining, by the processor, a defense probability for each defense schedule, the defense probability being based on the target schedule, the movement speed, the protection radius and a likelihood of the attacker attacking any of the targets;
    selecting, by the processor, a subset of defense schedules based on the probability for each defense schedule; and
    determining and outputting, by the processor, a planned defense schedule chosen at random from the subset of defense schedules.

2. The method of claim 1 wherein the likelihood of the attacker attacking any of the targets is based on the attacker's observation and analysis of movement of the plurality of mobile defense resources prior to the attack.

3. The method of claim 1 wherein determining the plurality of possible locations for each mobile defense resource includes:
    selecting a finite set of a plurality of locations where a mobile defense resource of a plurality of mobile defense resources traverse; and
    limiting the plurality of possible locations to the finite set.

4. The method of claim 1 wherein the target schedule specifies that the plurality of moving targets will move to a plurality of locations that are not all co-linear.

5. The method of claim 1 wherein each target of the plurality of moving targets has an importance value, the importance value of each target is stored in the memory, wherein determining the possible locations for each mobile defense resource is based on the importance value of each target.

6. The method of claim 5 wherein the importance value of each target changes as a function time.

7. The method of claim 6 wherein:
    the target schedule specifies that the plurality of moving targets will move to a plurality of locations that are not all co-linear; and
    determining the possible locations for each mobile defense resource includes selecting a finite set of a plurality of locations where the plurality of mobile defense resources traverse.

8. A system for scheduling locations of mobile defense resources for protecting a plurality of targets, a mobile defense resource being separate from a target, the system comprising:
    a memory configured to:
        store a target schedule for each target of a plurality of moving targets, the target schedule being a set of different times, each time within the set of different times having an associated location for each target, each target being a potential candidate for an attack by one or more mobile attackers having an ability to attack the target,
        store a specification of each mobile defense resource of a plurality of mobile defense resources having an ability to defend the target against the attack, the specification including a movement speed and a protection radius; and
    a processor configured to:
        determine a plurality of possible locations for each mobile defense resource at any of the times within the set of different times,
        determine a plurality of potential paths for each mobile defense resource, each potential path being based on a series of combinations of times from the set of different times and locations from the set of possible locations,
        determine a plurality of defense schedules, each defense schedule having, for each mobile defense resource, a path form the plurality of potential paths,
        determine a defense probability for each defense schedule, the defense probability being based on the target schedule, the movement speed, the protection radius and a likelihood of the attacker attacking any of the targets,
        select a subset of defense schedules based on the probability for each defense schedule, and
        determine and output a planned defense schedule chosen at random from the subset of defense schedules.

9. The system of claim 8 wherein the processor is further configured to:
    determine a new group of paths that decrease a probability of a successful attack against the plurality of moving targets in comparison to the plurality of potential paths; and
    combine the new groups of paths with the plurality of potential paths to form an updated plurality of potential paths.

10. The system of claim 8 wherein the plurality of possible locations for each mobile defense resource is determined by setting up a set of linear programs for two consecutive times within the set of different times to optimize the ability of the plurality of mobile defense resources to defend the target against the attack between the two consecutive times.

11. The method of claim 1 wherein determining the plurality of locations for each mobile defense resource is not based on a location of an attacker.

12. The system of claim 8 wherein the plurality of possible locations for each mobile defense resource is not based on a location of an attacker.

13. The method of claim 1 wherein determining the plurality of possible locations for each mobile defense resource at any of the times within the set of different times occurs before the attack has been mounted.

14. The system of claim 8 wherein the plurality of possible locations for each mobile defense resource at any of the times within the set of different times is determined before the attack has been mounted.

15. The method of claim 1 wherein the set of different times for the plurality of possible locations for each mobile defense resource are different than the set of different times for the target schedule.

16. The method of claim 1 wherein the defense probability is based on a likelihood of protection based on the target being within a protection range of multiple mobile defense resources.

17. The method of claim 1, further comprising moving the mobile defense resources according to the planned defense schedule.

\* \* \* \* \*